United States Patent [19]

Madell

[11] Patent Number: 5,950,171
[45] Date of Patent: Sep. 7, 1999

[54] SYSTEM FOR DETERMINING HYPOTHETICAL BOOK VALUE

[76] Inventor: John T. Madell, 4351 Grand, Western Springs, Ill. 60558

[21] Appl. No.: 08/920,075

[22] Filed: Aug. 26, 1997

[51] Int. Cl.[6] .................................................. G06F 17/60
[52] U.S. Cl. .................................. 705/7; 705/1; 705/10; 705/30; 364/411.1; 364/412.1
[58] Field of Search ................................... 705/7, 10, 38, 705/30, 35, 1; 364/578, 411.1, 412.1, 468.16, 468.24, 769, 813, 468.05

[56] References Cited

U.S. PATENT DOCUMENTS

| 4,263,654 | 4/1981 | Fukuzaki et al. | 376/216 |
| 5,249,120 | 9/1993 | Foley | 705/1 |
| 5,347,466 | 9/1994 | Nichols et al. | 364/578 |

OTHER PUBLICATIONS

Hirst et al., "Methods to Estimate Stranded Commitments for a Restructuring U.S. Electricity Industry", Oak Ridge National Laboratory, 50 pages, Jan. 1996.
Lester W. Baxter, "Different Approaches To Estimating Transition Costs In The Electric–Utility Industry", Oak Ridge National Laboratory, 85 pages, Oct. 1995.
Abbott et al., "U.S. Electric Utilities: Break–Even Analysis Reveals Large Variation in Generating Costs", Moody's Investors Service, 14 pages, Jun. 1994.
Fremont et al., "Stranded Costs Will Threaten Credit Quality of U.S. Electrics", Moody's Investors Service, 17 pages, Aug. 1995.
Kathleen Hart, Duke Power To Stay A Generator, Will Buy Fossil And Nuclear Units, Nucleonics week, vol. 37, No. 44, Oct. 1996.

*Primary Examiner*—Frantzy Poinvil
*Assistant Examiner*—Raquel Alvarez
*Attorney, Agent, or Firm*—Marshall, O'Toole, Gerstein, Murray & Borun

[57] ABSTRACT

A system for producing sets of competitive depreciation rates (CDRs) for a high-cost plant based on the hypothetical book value of the plant, such that the application of any set would result in the plant generating electricity competitively. A CDR set consists of one or more higher-than-standard depreciation rates first applied sometime prior to the start of competition, and one or more lower-than-standard depreciation rates first applied sometime after the start of the plant's competitive operation and continued for the rest of its life. The system also calculates the potential stranded assets (PSAs) and the time-at-risk (TAR) associated with the power plant prior to its reaching competitive operation. The system is designed to analyze the competitiveness of an individual high-cost power plant, hereafter known as the first plant, over its full lifetime under given assumptions and conditions about the introduction of competitive marketing of electricity.

18 Claims, 24 Drawing Sheets

SYSTEM FOR DETERMINING HYPOTHETICAL BOOK VALUE

BACKGROUND OF THE INVENTION

The invention is directed to a system which determines economic parameters of a high-cost, electricity-generating power plant.

Although most competition in electricity sales is currently limited to the relatively small wholesale market, strong indications point to regulatory reforms which would base the electricity prices in the larger retail market on competitive performance rather than on cost recovery, as present regulations permit. In the transition from a regulated market to a competitive one, utilities are concerned about lower cost power from other utilities and non-utility generators winning over their retail customers. In anticipation of this competition, regulated utilities are reducing their costs of operations through a variety of strategies, but even so the electricity from some high-cost power plants could remain non-competitively priced. If the situation were not corrected, some plants may be shut down and their capital costs may not be recovered by their owners. These unrecovered costs are termed "stranded assets or costs," which could represent a loss to the stock holders of billions of dollars. One resolution is reducing the fixed capital component of the high-cost plant's generating costs by accelerating its depreciation beginning in the period prior to competition. The capital cost component could possibly be reduced sufficiently to result in the plant generating electricity at a competitive total cost.

Methods for calculating "standard" depreciation rates are well established in numerous text books, tax and regulatory guides and professional publications. In the case of an electricity generating plant, methods usually consist of establishing a plant lifetime and setting the rate based on the straight-line method. These methods permit increasing and decreasing the rate only if the value or lifetime of the plant has changed. Changes in the value or lifetime must be documented in the depreciation study as occurring or having occurred. For changes in value the methods look at the retirement records of the plant components to determine whether the depreciation rate should be changed. If the useful life of a plant were seen to differ from its design life, the depreciation rate would likewise change. Most plants operate beyond their design lifetime, so their depreciation rates are more likely to be decreased than increased, as the plants pass their established lifetimes.

These conventional methods permit changes in depreciation rates based on actual changes in value or lifetime of an asset but not on anticipated changes some time in the future. Thus the concept of accelerated depreciation to meet competition in the future is a new one for industries, including electric utilities, that use conventional depreciation methods. Likewise, the concept of stranded assets is not a familiar one in a regulated industry. The regulators of the electricity industry have set the rate structure for the utility to recover its costs, including capital assets, so stranded assets could only exist with some kind of regulatory reform. Thus, the prior art of calculating CDRs and PSAs for electricity plants is either non-existent or non-relevant.

As stated above, the concepts of stranded assets and accelerated depreciation have been used in connection with utility power plants only for the last few years. In this short period of time, numerous papers and articles have been published on stranded assets and a few references have been made to accelerated depreciation of power plants. The expectation of competition in the electricity market has also caused utilities to treat much of the financial data on their generating plants confidentially, with the result that few details are provided about the analysis of the two concepts. A few financial organizations (e.g., Moody's and Resource Data International) have used public data to estimate the stranded assets of utilities which could be financially exposed in case of retail competition of electricity. These reports do not provide sufficient information about their methodology to reproduce their results. It is clear, however, that these published reports and papers take a different approach to determining CDRs and PSAs from the one presented here. Thus, a review of the available information on the calculation of CDRs and PSAs by the electricity-generating community failed to reveal any routines or any systems which are used to obtain these quantities. Thus there is no indication of any relevant prior art in the electricity generating industry.

It is conceivable that systems for determining CDRs and PSAs have been developed for other than the electricity generating industry. To be relevant to the invention presented here, the other industry(ies) must be similar in several respects to the electricity one. First, the industry must have made (or is making) the transition from a regulated one with full capital recovery to a semi- or fully deregulated one with most of its product(s) priced by actual competition. Second, the industry must be very capital intensive with units of assets having a long lifetime relative to the transition period between regulated and market environments. Lastly, the regulatory reform must potentially result in significant cost variations in the product(s) or service(s) within the affected industry, and further these variations either would exist fundamentally or would be difficult to eliminated. The industry that seems to come the closest to the electricity industry in all these respects is the U.S. airline industry that went through deregulation over a decade ago and now competes for customers in the open market. Its aircraft represent large capital assets whose life of 30+ years is much longer that the transition time of deregulation. There were and to some extent still are large cost differences in the operating expenses between the long-established airlines and the recently formed "low-cost" carriers due primarily to labor contracts. As far as known, the transition period for airline deregulation did not allow enough time to write-off any significant assets, and no provisions in the de-regulation legislation were made to recover stranded assets. The surviving established airlines used strategies such as reducing operating costs (i.e., wages), restructuring, merging and innovative marketing, etc. rather than accelerated depreciation. The non-survivors suffered large losses due to actual stranded assets.

SUMMARY OF THE INVENTION

The invention is directed to a system for determining the hypothetical book value of a first power-generating plant based on economic analysis of a plurality of potentially competing power-generating plants. The system includes a processor, a memory coupled to the processor which stores economic data relating to the first power-generating plant and the potentially competing power-generating plants, and means for determining the hypothetical book value of the first power-generating plant based on the economic data relating to the first power-generating plant and the potentially competing power-generating plants.

The determining means includes first means for determining a power-generating cost (such as a levelized cost) for each of the potentially competing power-generating plants for each of a number of time periods (such as years), a second means for analyzing the power-generating costs to determine a most-competitive power-generating cost for the power-generating plants for each of the time periods, and third means for determining the hypothetical book value for the first power-generating plant based on the most-competitive power-generating costs determined by the second means.

The determining means of the system may also include fourth means for determining sets of competitive depreciation rates for the first power-generating plant based at least in part on the hypothetical book value for the first power-generating plant, fifth means for determining a plurality of annual depreciation charges for the first power-generating plant based on the competitive depreciation rates for the first power-generating plant, and/or sixth means for determining a plurality of potential stranded asset values for the first power-generating plant based at least in part on the annual depreciation charges for the first power-generating plant.

These and other features of the invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
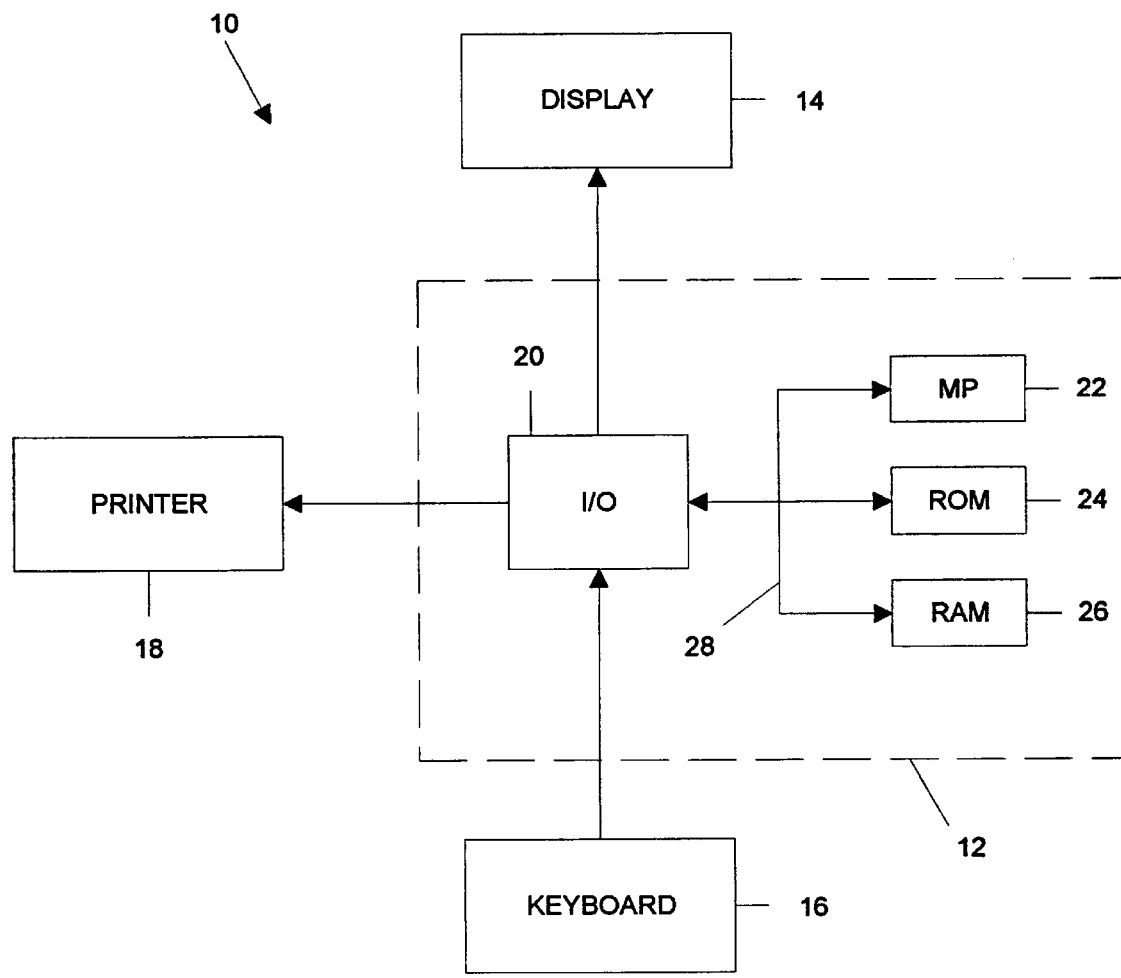
FIG. 1 is a block diagram of a preferred embodiment of a system in accordance with the invention.

FIG. 1 illustrates a block diagram of a preferred embodiment of a system 10 in accordance with the invention. Referring to FIG. 1, the system 10 has a controller 12 connected to a display device 14, such as a CRT, a keyboard 16, and a printer 18. The controller 12 includes an I/O circuit 20, a microprocessor 22, a read-only memory (ROM) 24, and a random-access memory 26, all of which are interconnected by an address/data bus 28. The system 10 may also include other components, such as hard disk. The ROM 24, RAM 26, and hard disk are referred to, individually and collectively, as the "memory" of the system 10.

Memory Organization

Figure 2A:
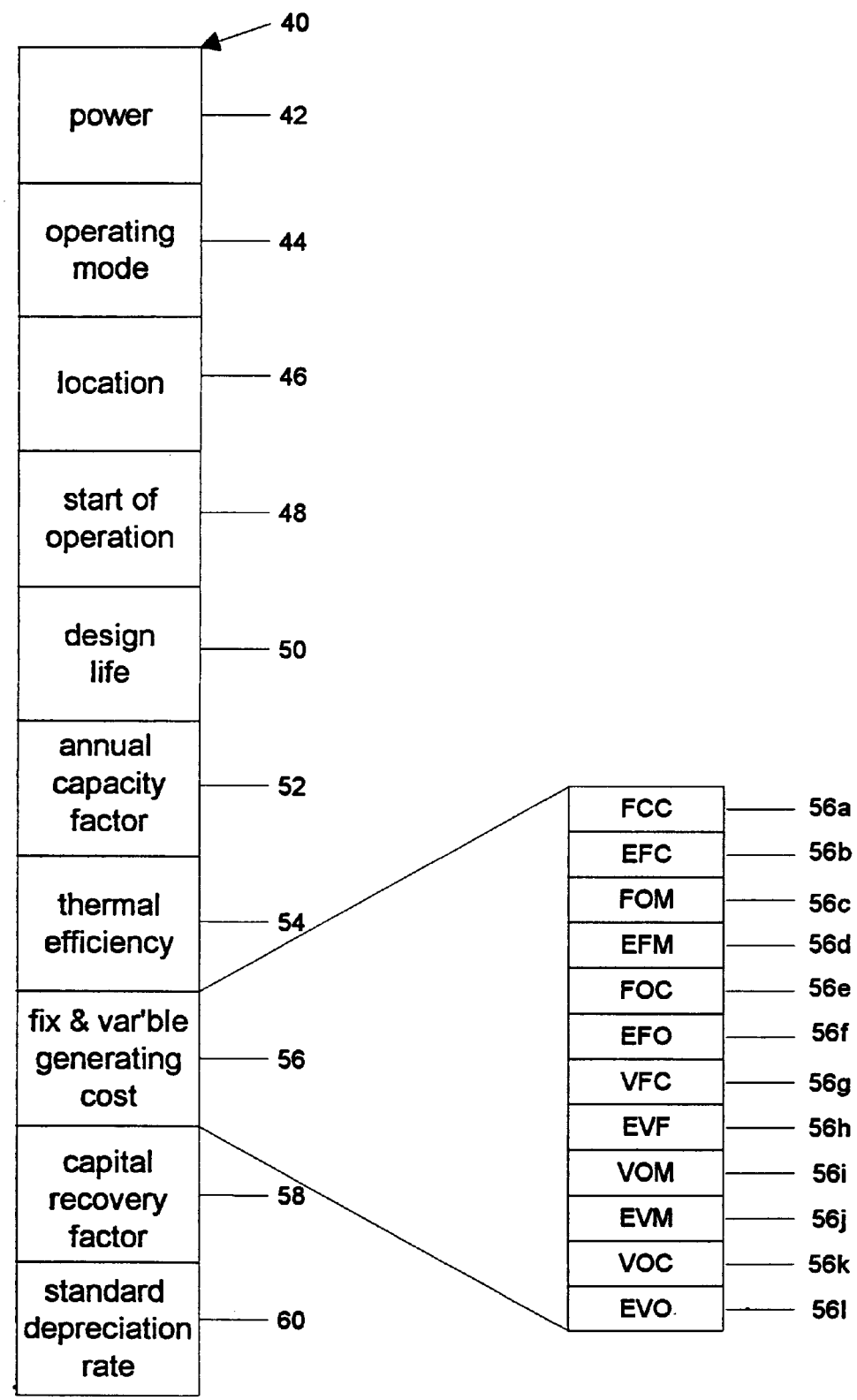
FIGS. 2A–2H illustrate the memory organization of the system.

The memory of the system 10 stores various economic data, as described below in connection with FIGS. 2A–2H. Referring to FIG. 2A, a data file 40 stores data which define the economic performance of a high-cost, electricity-generating power plant, referred to as the "first plant," for which economic parameters, such as hypothetical book value, are to be determined.

The data file 40 contains a number of data fields. A first data field 42 contains the electrical power capacity (MWE) in megawatts electric, a next field 44 holds the operating mode, and a third field 46 has the geographic location for the first plant. Data fields 48 and 50 contain the year in which the first plant began operation (YBO) and its design life in years, respectively. Performance parameters of average annual capacity factor and thermal efficiency are stored in data fields 52 and 54, respectively.

The cost parameters in a data field 56 are an array of six levelized values followed immediately by its cost escalation rate: the fixed capital cost (FCC) of the first plant in units of dollars in a field 56$a$ and its annual escalation factor (EFC) in a data field 56$b$; the fixed operating and maintenance cost (FOM) in units of dollars/year in a field 56$c$ and its annual escalation factor (EFM) in a data field 56$d$; fixed other costs (FOC) in units of dollars/year in a field 56$e$ and its annual escalation factor (EFO) in a data field 56$f$; variable fuel costs (VFC) in units of dollars/million British Thermal Units (BTUs) in field a 56$g$ and its annual escalation factor (EVF) in a data field 56$h$; variable operating and maintenance costs (VOM) in units of dollars/kilowatt-hour (kw-hr) in a field 56$i$ and its annual escalation factor (EVM) in a data field 56$j$; and variable other costs (VOC) in units of dollars/kw-hr in a data field 56$k$ and its annual escalation factor (EVO) in a data field 56$l$. Two economic parameters, capital recovery factor (CRF) in units of reciprocal years and standard depreciation rate (SDR) in units of percent are stored in data fields 58 and 60, respectively.

Figure 2B:
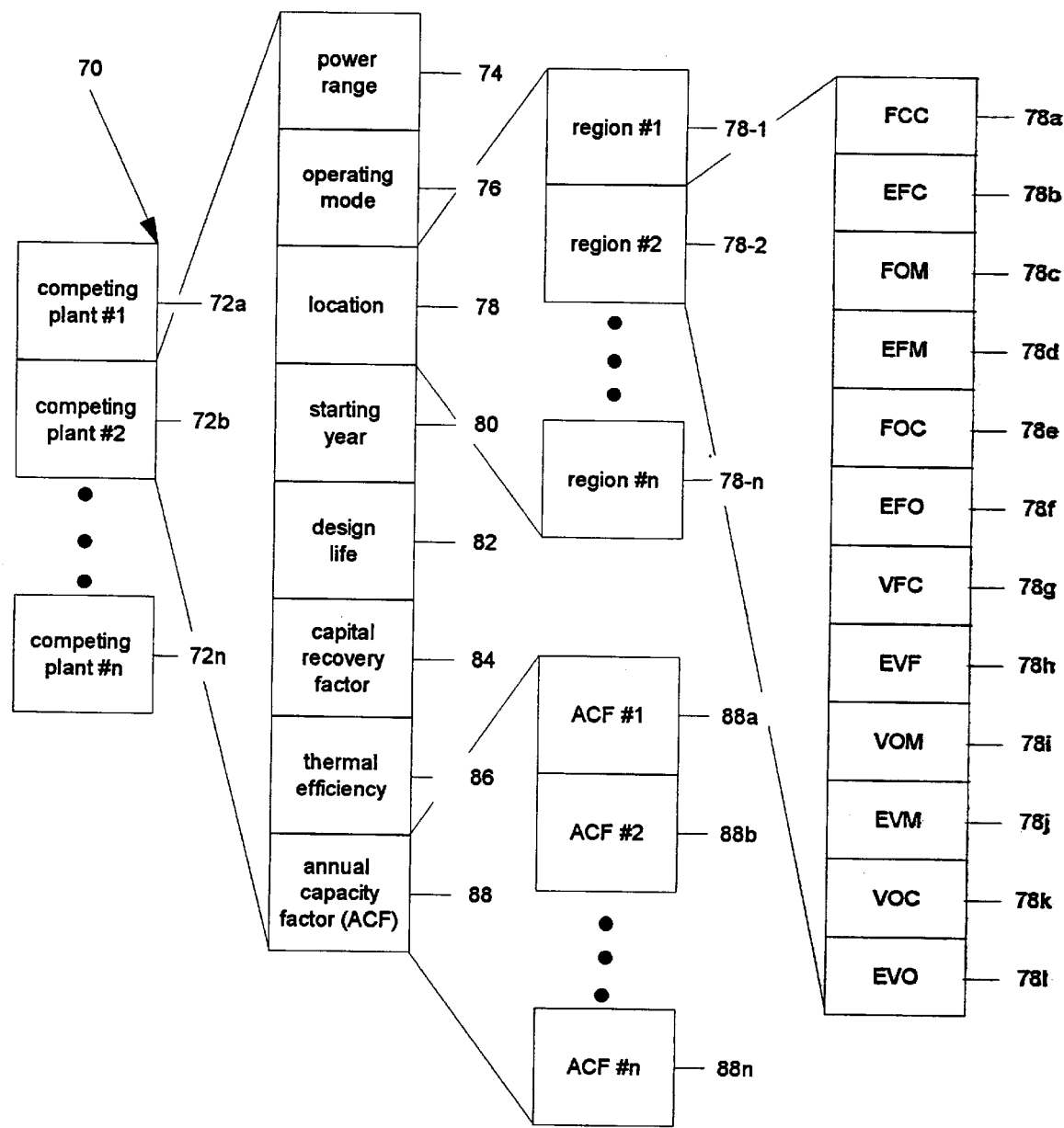

Referring to FIG. 2B, a data file 70 contains economic parameters for each of a number of power-generating plants that would potentially compete with the first plant. Data fields 72$a$–72$n$ store data for each of the potentially competing plants, designated #1 to #n.

For each competing plant in each of the data fields 72$a$–72$n$, the following economic parameters are stored: the power range (MWE) in units of megawatts electric in a data field 74; the operating mode in a data field 76; the location of the competing plant in an array of regions of the country in data field 78; the beginning year of operation in a data field 80; the design life in units of years in a data field 82; the capital recovery factor (CRF) in units of reciprocal years in a data field 84; and the thermal efficiency in units of BTU/kw-hr in a data field 86; and annual capacity factors given by a range of values in a data field 88.

Referring to the data field 78, the country is divided into regions for which average generating cost parameters are determined, and these regions designated #1 through #n are stored in an array having data fields 78-1 through 78-n.

For each region, the following cost parameters are stored, followed immediately by its cost escalation rates: FCC with units of dollars in a data field 78a and its annual escalation factor (EFC) in a data field 78b; FOM with units of dollars/year in a data field 78c and its annual escalation factor (EFM) in a data field 78d; FOC with units of dollars per year in a data field 78e and its annual escalation factor (EFO) in a data field 78f; VFC with units of dollars/million BTUs in 78g and its annual escalation factor (EVF) in a data field 78h; VOM with units of dollars/kw-hr in data field 78i and its annual escalation factor (EVM) in a data field 78j; and VOC with units of dollars/kw-hr in data-field 78k and its annual escalation factor (EVO) in a data field 78l. The range of ACFs (no units) are assigned to an array as #1 through #n in a data field 88.

Figure 2C:
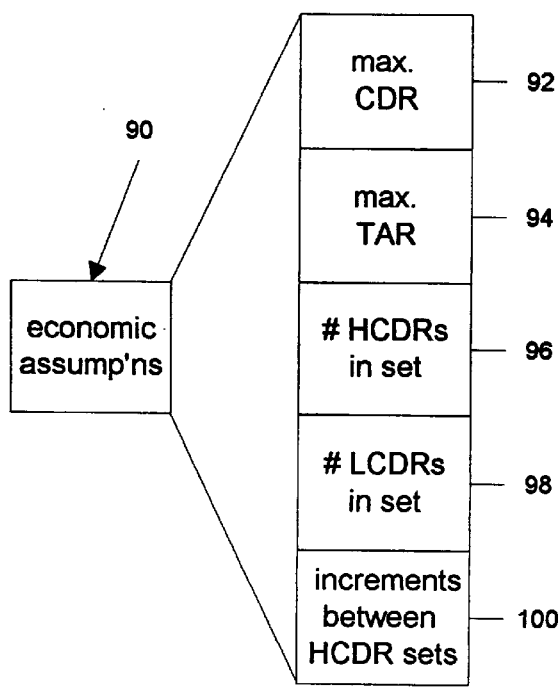

Referring to FIG. 2C, a data file 90 contains the assumed values of the parameters on which the economic analysis of the expected competition is based. The data file 90 contains the following six parameters: the maximum acceptable value for a CDR with units of percent in a data field 92; the maximum TAR with units of years in a data field 94; the number of HCDRs in a sets (no units) in a data field 96; the number of LCDRs in a set (no units) in a data field 98; increment in HCDR from one set to the next (with units in percent) in a data field 100.

Figure 2D:
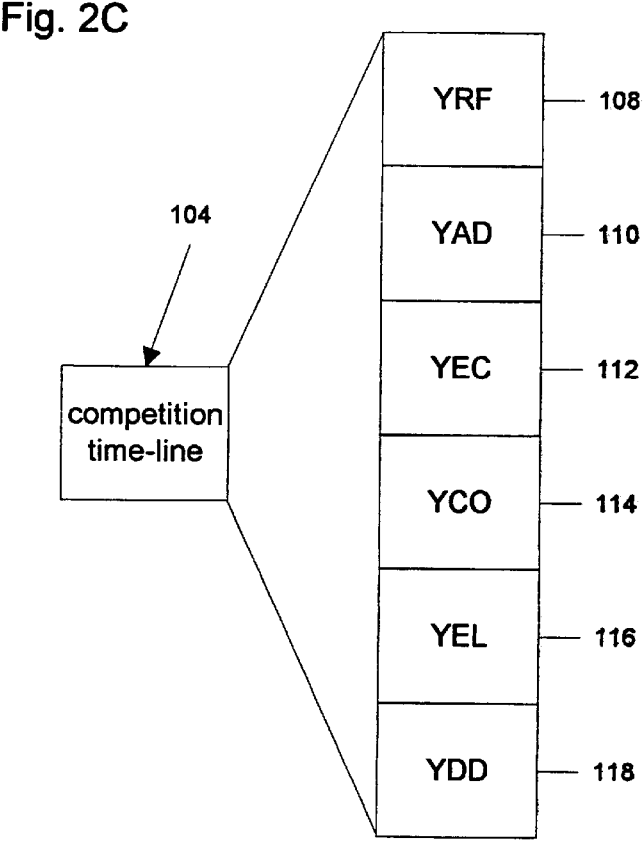

Referring to FIG. 2D, a data file 104 contains the assumed values of the timing for the expected competition on which the economic analysis is based. The data file 104 contains time-line values with the following dates, all with the units of years: the reference year (YRF, usually the current year) in a data field 108; the year of the first application of a HCDR (YAD) in a data field 110; the year of the earliest start of electricity competition (YEC) in a data field 112; the first year of the competitive operation of the first plant (YCO) in a data field 114; the last year of the first plant operation (YEL) in data field 116; and the year of decommissioning of the first plant (YDD) in data field 118.

Figure 2E:
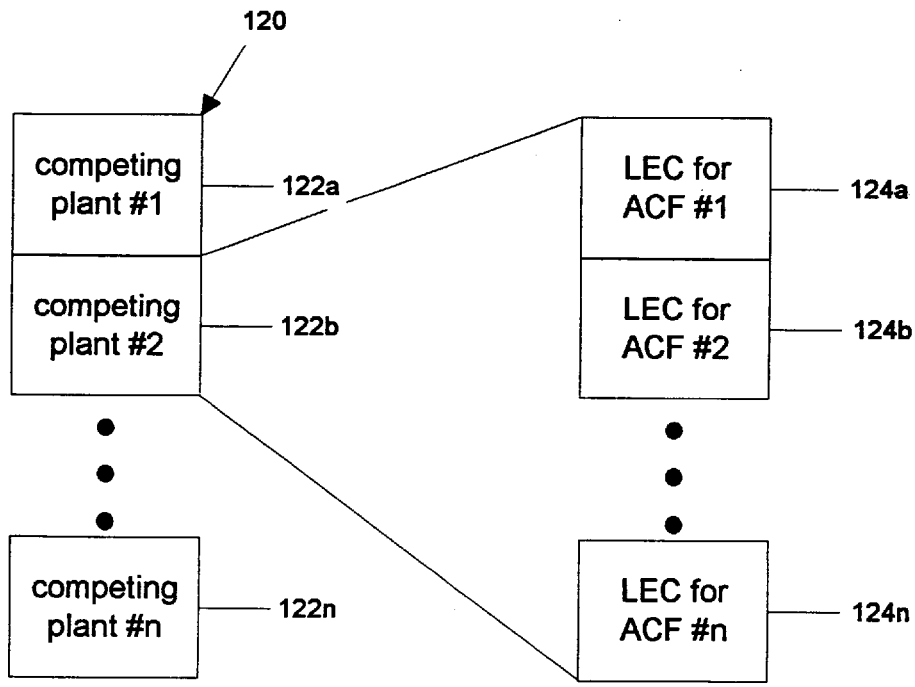

Memory allocations are also made for quantities calculated and used by various software routines, as described below. Referring to FIG. 2E, the results from a screening routine 160 are stored in a data file 120 for each potentially competing plant. Each of the competing plants #1 through #n is assigned to one of a number of respective data fields 122a–122n, and for each plant the levelized electricity costs (LEC) are assigned in data fields 124a–124n for each of the ACFs that are stored in the data fields 88a–88n.

Figure 2F:
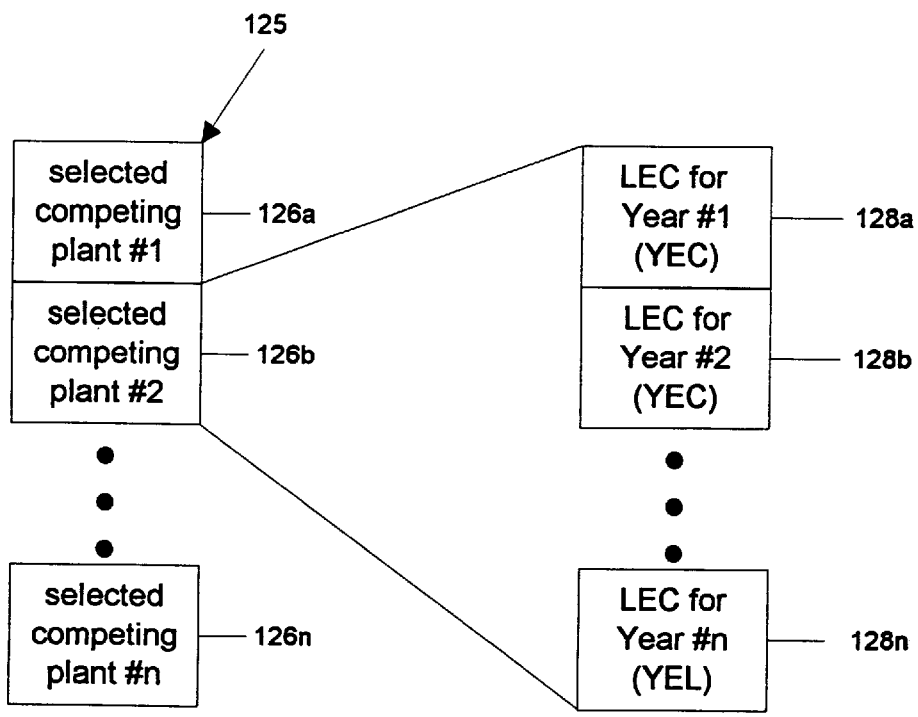

Referring to FIG. 2F, a data file 125 contains data on the competing plant(s) which is (are) determined to be the most competitive (as described below). For each competing plant in data fields 126a–126n, an array of LECs is stored in one of a number of data fields 128a–128n for the start of operations in each year between YEC and YEL.

Figure 2G:
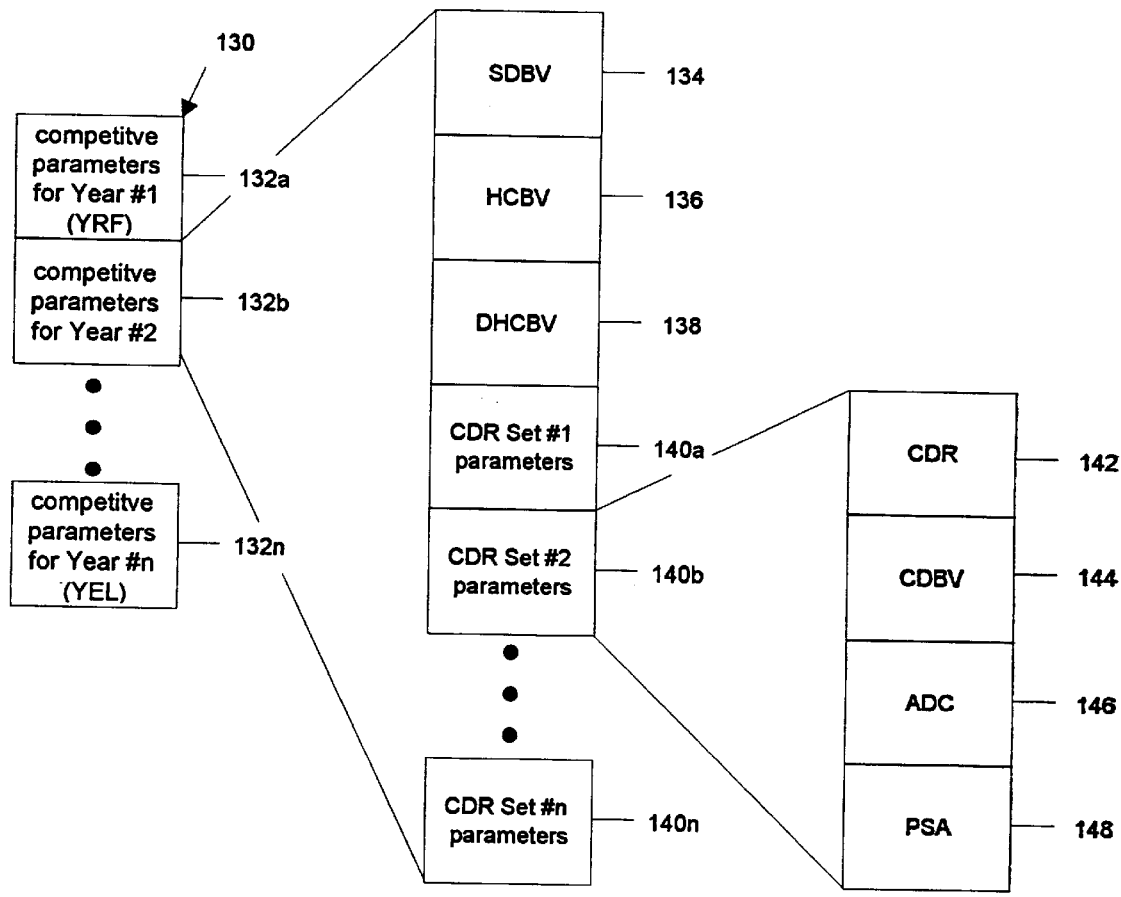

Referring to FIG. 2G, a data file 130 stores arrays of economic parameters for the competitive operation of the first plant. Data fields 132a–132n contain an array of the years from YEC to YEL. For each year, the following economic parameters (calculated by various software routines described below) are stored in memory: the standard depreciated book value (SDBV) with unit of dollars in a data field 134; the HCBV with unit of dollars in a data field 136; the depreciated HCBV at YCO in a data field 138; and an array of the CDR set parameters from Set #1 to Set #n in data fields 140a–140n.

For each CDR set, the following quantities are stored in memory: the CDR expressed as a percent in a data field 142; the competitive depreciated book value (CDBV) with units of dollars in a data field 144; the ADC with units of dollars in a data field 146; and the PSA with units of dollars in a data field 148.

Figure 2H:
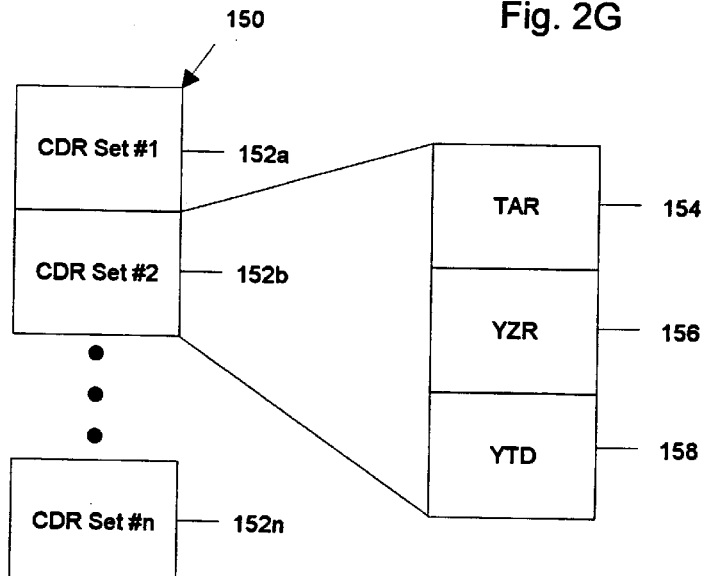

Referring to FIG. 2H, economic parameters which have a single value for each CDR set are stored in a data file 150 having a number of data fields 152a–152n, one for each set of CDRs. For each set of CDRs, the TAR with units of years is stored in a data field 154, the year when PSA reaches zero (YZR) is stored in a data field 156, and the transition year between the high and low depreciation rates (YTD) is stored in a data field 158.

Overall Operation

The system 10 is controlled by a computer program stored in the memory of the system 10 and executed by the microprocessor 22. The computer program includes six routines, which are executed sequentially during the operation of the system 10. The main functions of the six routines are (1) to screen potentially competing plants, (2) to obtain the most competitive electricity costs over the remaining life of the first plant, (3) to compute the HCBVs, (4) to determine sets of CDRs and TARs, (5) to calculate the ADRs and CDBVs for each CDR set, and (6) to obtain the PSAs for each set of CDRs.

Figure 3:
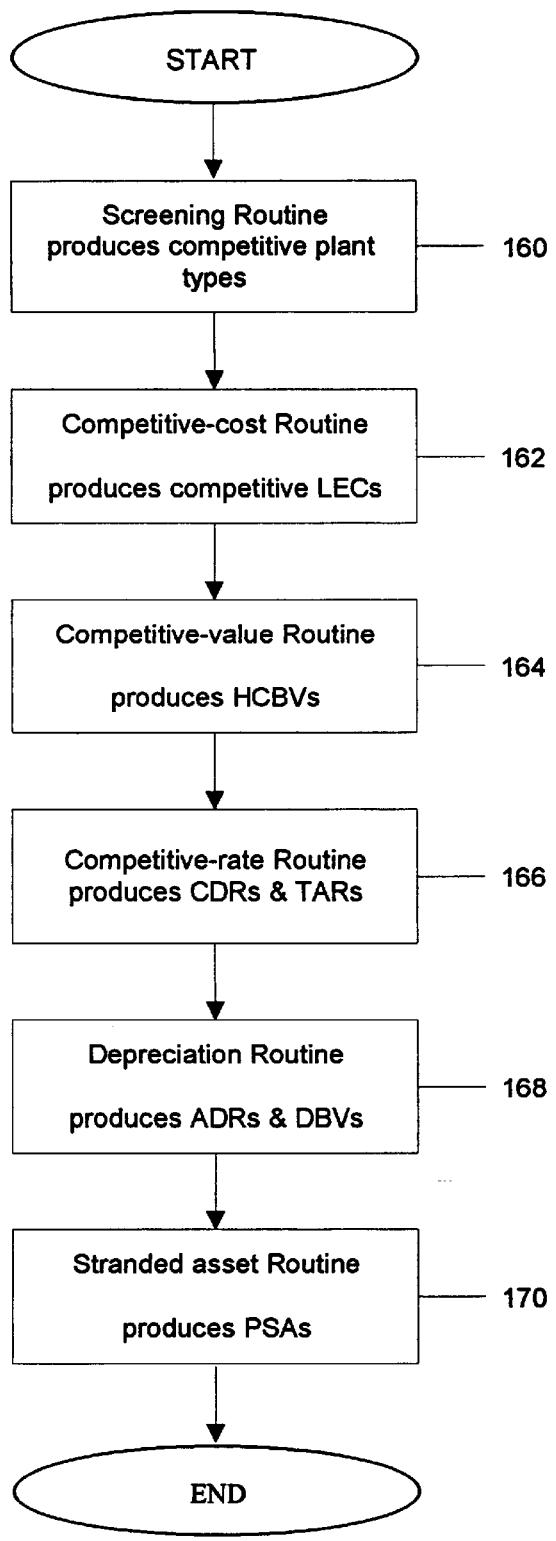
FIG. 3 is a flow diagram of the overall operation of the system.

Referring to FIG. 3, the first routine, called a screening routine 160, calculates the LECs of all potentially competing plants with the same power range, operating mode and location as the first plant for the year YEC and selects the most competitive one(s). The second routine, called a competing-cost routine 162, computes the minimum LECs for each year from YEC to YEL for the most competitive plant(s). The third routine, called a competitive-value routine 164, calculates the HCBVs for the first plant for the years from YEC to YEL. The fourth routine, called a competitive-rate routine 166 determines sets of CDRs with valid TARs that will result in competitive operation of the first plant within the assumptions stored in the data files 90 and 104. The fifth routine, called a depreciation routine 168, computes the annual depreciation charges and depreciated book values for the appropriate years during the life of the first plant. The sixth routine, called a stranded-asset routine 170, calculates for each CDR set the PSAs of the first plant for each year beginning with YEC.

Screening Routine 160

Figure 4:
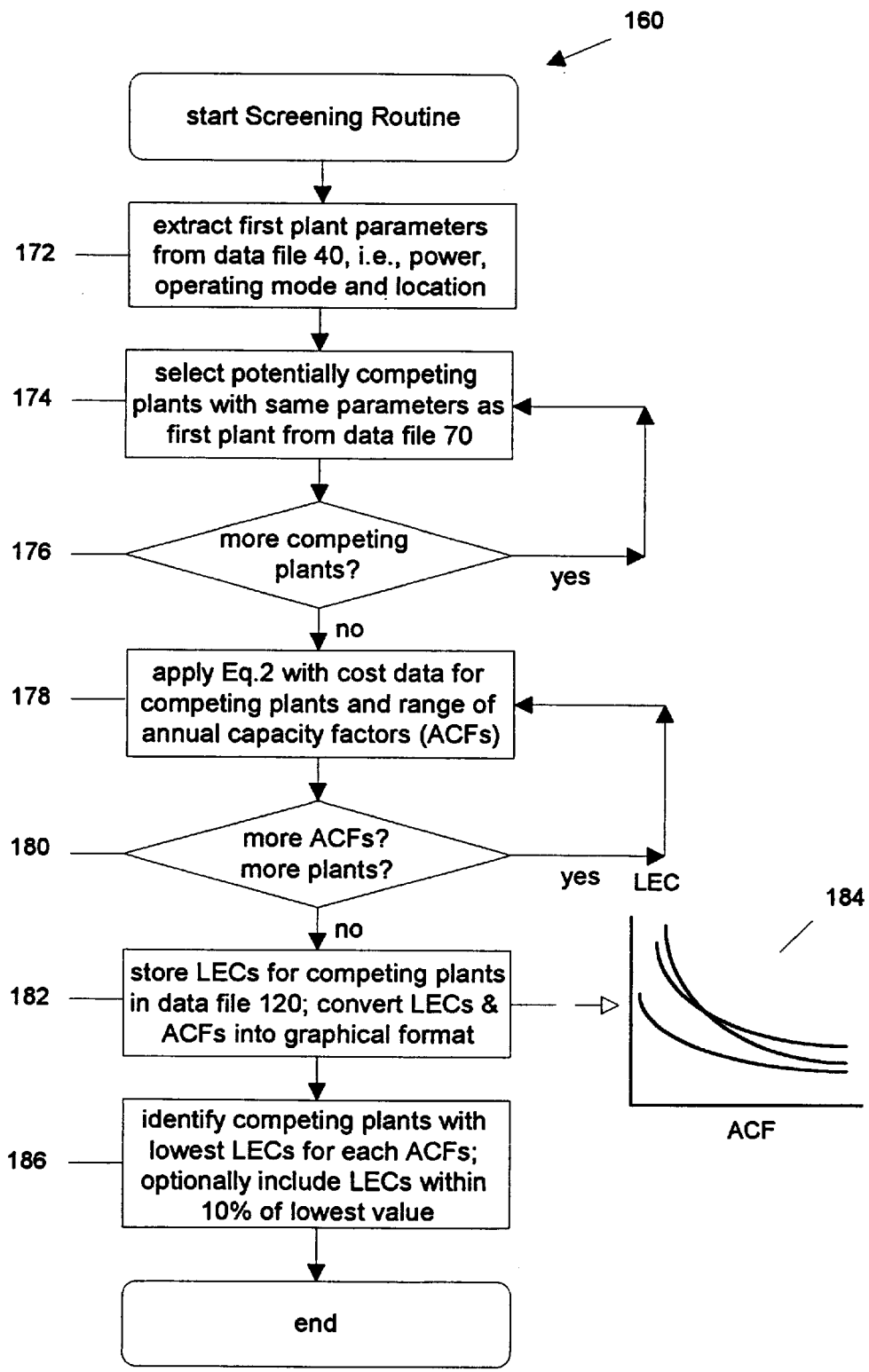
FIG. 4 is a flow diagram of the screening routine 160 shown schematically in FIG. 3.

FIG. 4 is a flow diagram of the screening routine 160 schematically shown in FIG. 3. The screening routine 160 screens all of the competing plants which potentially could generate electricity at a competitive cost in the same electricity market as that of the first plant i.e., the same power capacity, operating mode and location. The key operations in the routine are (1) using the marketing parameters of the first plant (i.e., power, operating mode and location) to extract data on the potentially competing plants, (2) computing the LECs of the potentially competing plants over a wide range of ACFs, and (3) identifying the competing plant(s) with the lowest LECs over a range of first plant's ACF ±0.10. The screening routine performs these key operations by the steps shown in the flow diagram in FIG. 4.

Referring to FIG. 4, the screening routine 160 starts in step 172 by extracting the power, the operating mode and the location from the data fields 42, 44 and 46 respectively, and by taking YEC from the data field 112. Then step 174 searches the data file 70 for the competing plants of the same power range, operating mode and location, which would potentially compete with the first plant. The plants that are identified as potentially competing ones are those with power within ±25% of that of the first plant, with the same operating mode as that of the first plant and with the location in the same region as that of the first plant. The competing plants in the data file 70 include pulverized coal, fluidized bed, oil-fired boiler, gas turbine, gas turbine combined cycle (GTCC), nuclear reactors and unusual designs, such as waste-to-energy and biomass fueled generators. The searching continues until all the potentially competing plants in data file 70 are determined in step 176 to have been identified.

The screening routine 160 next screens the completing plants which were identified as being potential competitors to the first plant in the electricity market. Step 178 calculates the electricity cost for each competing plant using the descriptive and cost data from the data file 70, and levelizes them from the beginning of its operation in the year YEC to the end of its life. The LEC over the range of ACFs in the data fields 88a–88n are obtained by means of the equations discussed below.

The equations below for electricity cost are applicable to any electricity generator. For calculational purposes, the electricity generating cost may be divided into fixed and variable components. The general form of the equation for LEC in units of cents per kw-hr is:

$$LEC = (\text{annual fixed costs})/(\text{annual energy produced}) + (\text{variable costs per energy produced}) \quad (1a)$$

The fixed costs consists of depreciation of a plant's capital cost, part of the operation and maintenance (O&M) costs and other fixed costs, such as most taxes and fees, negative salvage and decommissioning costs. The variable costs are the fuel costs, the remainder of the O&M costs and other variable costs, such as the rest of the taxes and fees. For the competing plant, these cost data are levelized over a plant's life to obtain the electricity cost for the full period of competition.

The cost components stored in memory are already levelized to the reference year, YRF. The costs are adjusted for escalation between YRF and the starting year, YST, by use of an escalation rate, ESR, as shown in the equation below:

$$\text{cost}(YST) = \text{cost}(YRF) * (1.0 + ESR)^{(YST-YRF)} \quad (1b)$$

The cost calculations in the system 10 include escalation depending on the year to which the costs are levelized.

The specific form of the equation for LEC with its fixed and variable components, including the adjustment for escalation, is:

$$LEC = [FCC*CRF + FOM + FOC]/[MWE*ACF]*100/8766 + [VFC*KBK*TEF + VOM + VOC]*100 \quad (2)$$

The parameters in Equation (2) have been defined earlier, except for KBK which is a constant to convert VFC to $/BTU (a listing of acronyms used herein and their meanings is set forth below).

Step 180 tests that all LEC values for the competing plants with the same power range, operating mode and location as the first plant have been obtained over the range of ACFs. In step 182, the LECs of the competing plants are stored in the data file 120 and are also translated into a graphical format with their corresponding ACFs for storage in data field 184. Step 186 finds the competing plant(s) which produce the lowest LECs (i.e., the most competitive electricity) within the range of ±0.10 of the first plant's ACF by searching through data file 120 and identifying this (these) plant(s) with a mark in the data field 72a through 72n. Step 186 may optionally find any additional plant(s) whose LECs are within 10% of the lowest LECs.

EXAMPLE

Figure 5A:
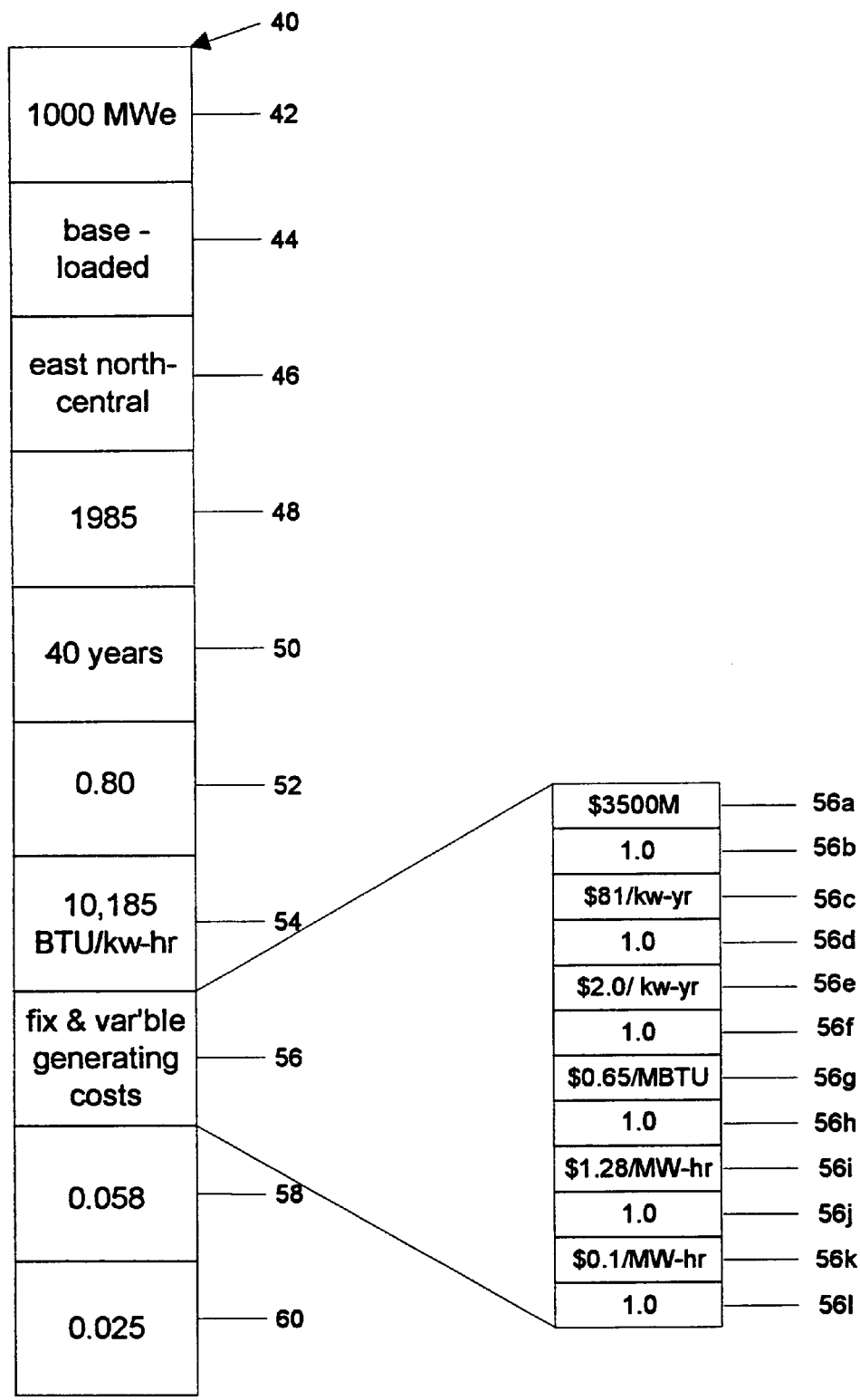
FIGS. 5A–5H present exemplary results obtained during operation of the system.
Figure 5B:
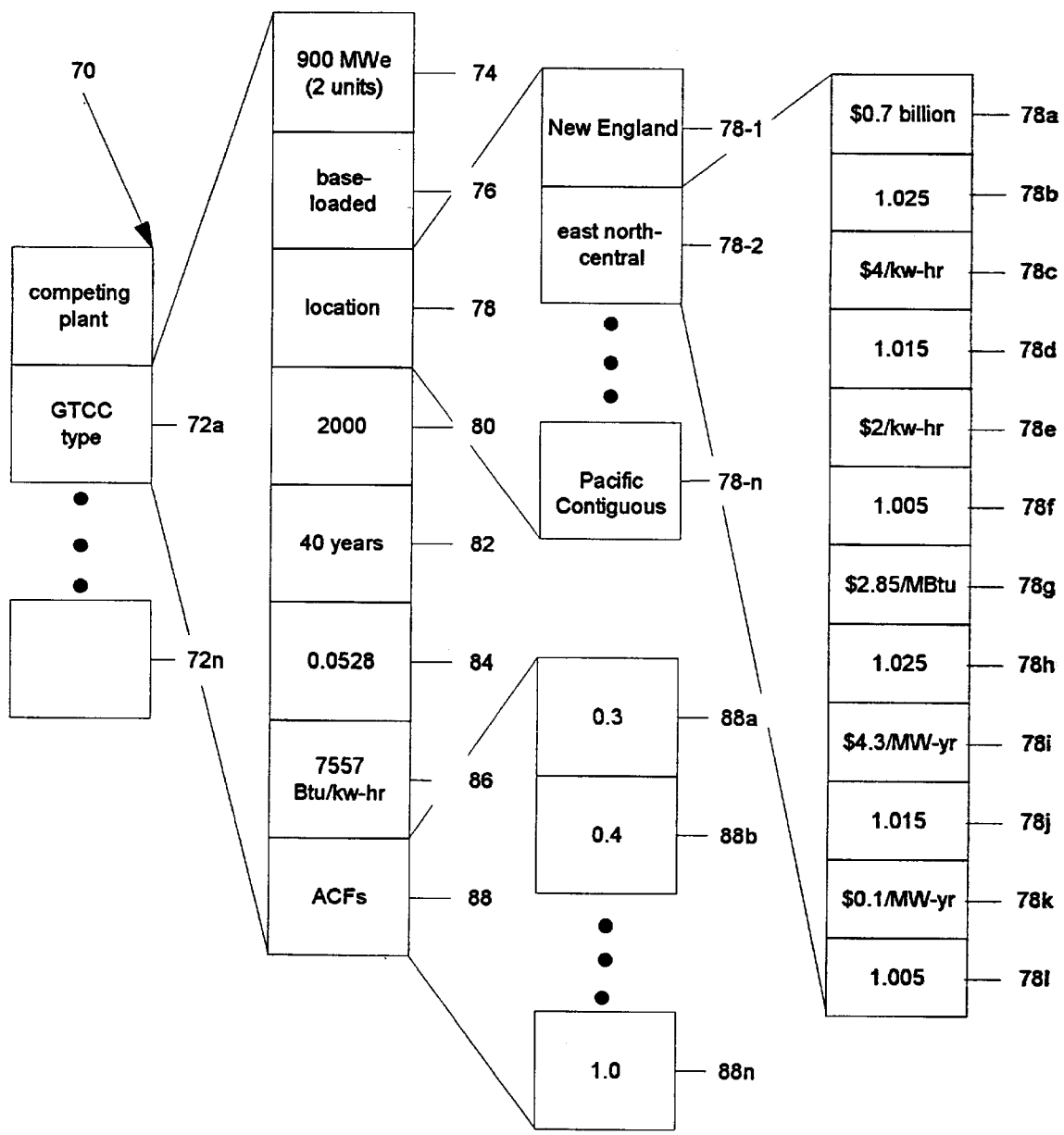
Figure 5C:
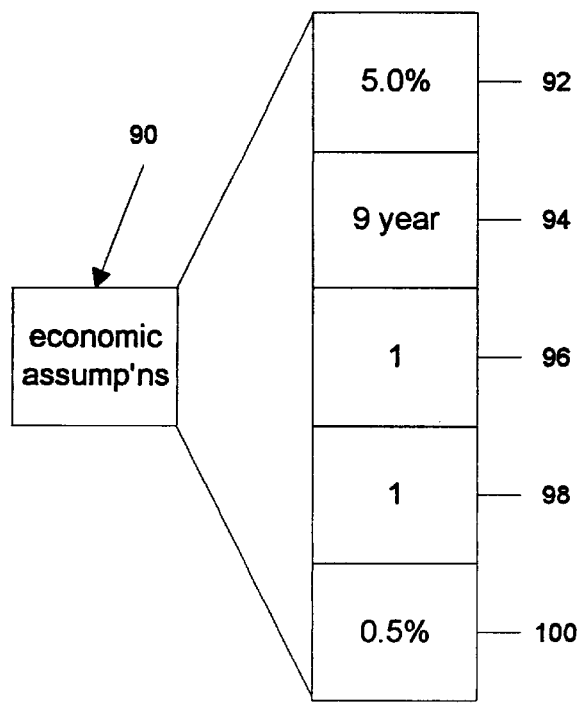
Figure 5D:
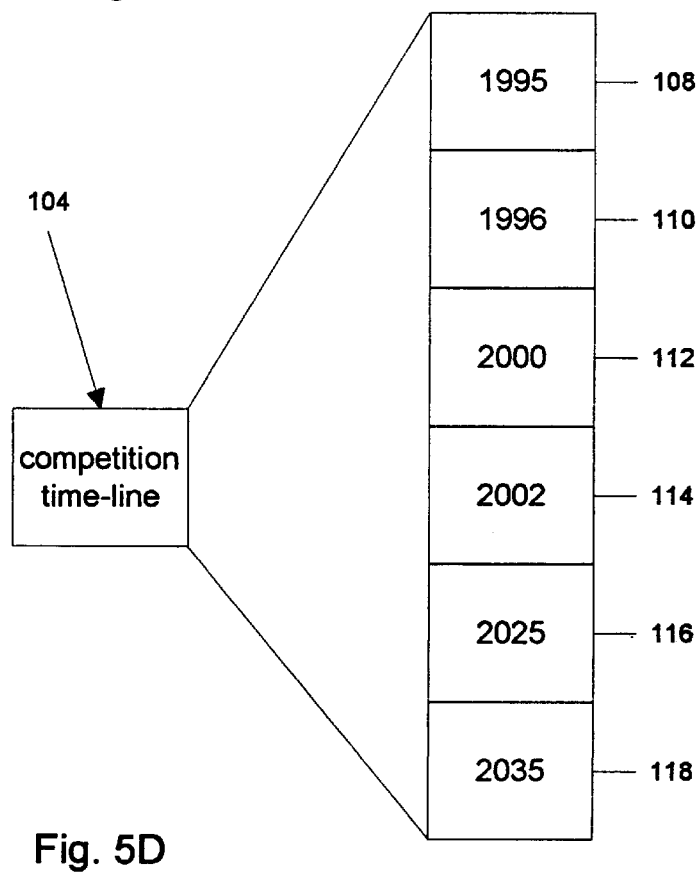

An example of the operation of the screening routine 160 begins with a description of the data files 40, 70 and 90, shown in FIGS. 5A, 5B and 5C, respectively. The data file 40 in FIG. 5A represents a first plant of 1000 MWe power with a base-load operating mode in the east north central region of the United States. FIG. 5B shows a very small version of the data file 70 with only three competing plants, a coal-fired unit, a GTCC unit and a uranium (nuclear) powered unit. All three competing plants have the same power range, operating mode, location as the first plant. The data files 90 and 104, respectively, in FIGS. 5C and 5D contain typical assumptions and guidelines for a regulatory reform study, except the reference year in the data field 108 is two years earlier than the current year (1997).

Figure 5E:
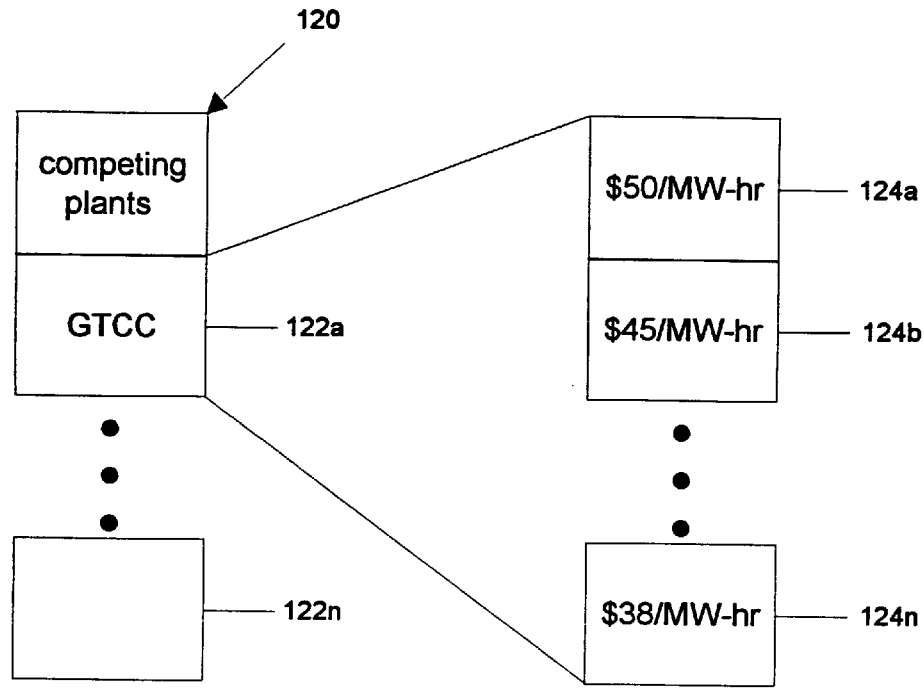

In the example, step 172 of the screening routine 160 reads from memory the parameters of power, operating mode and location of the first plant from the data fields 42, 44 and 46, and step 174 finds that all three of the competing plants in data file 70 have the same parameters. After step 176 determines that no further competing plants with the same parameters as the first plant exist in the data file 70, the LECs for each of the three competing plants are calculated from Equation (2) in step 178 by using the cost data and ACFs. Once step 180 determines that the LECs have been calculated for all the ACFs of the three competing plants, step 182 stores the LECs in the data file 120 for each competing plant, as shown in FIG. 5E.

Figure 5F:
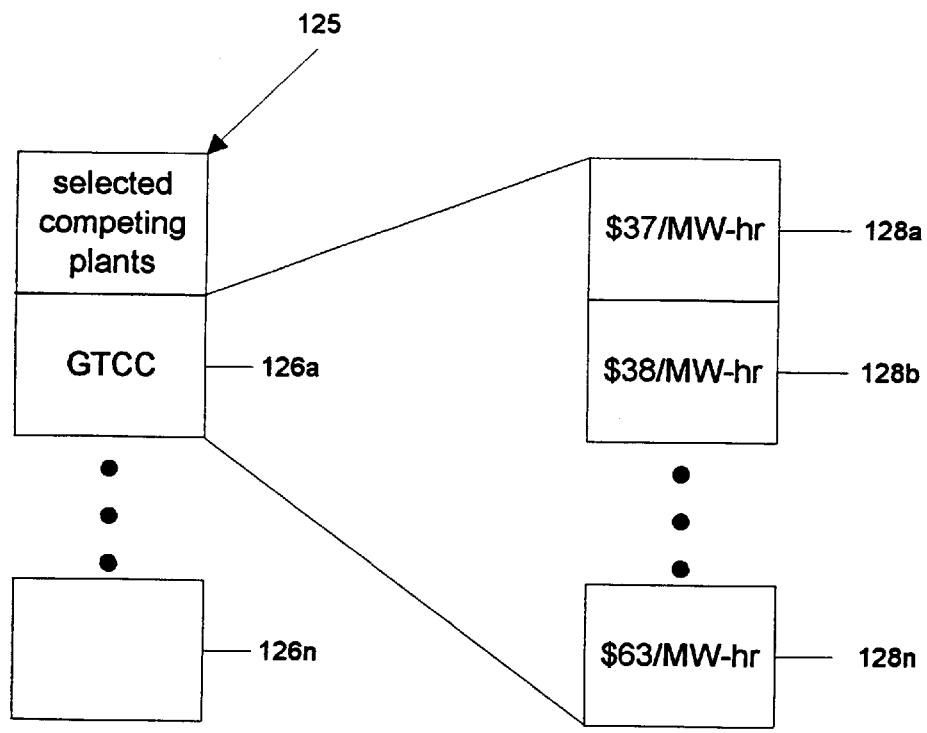
Figure 6:
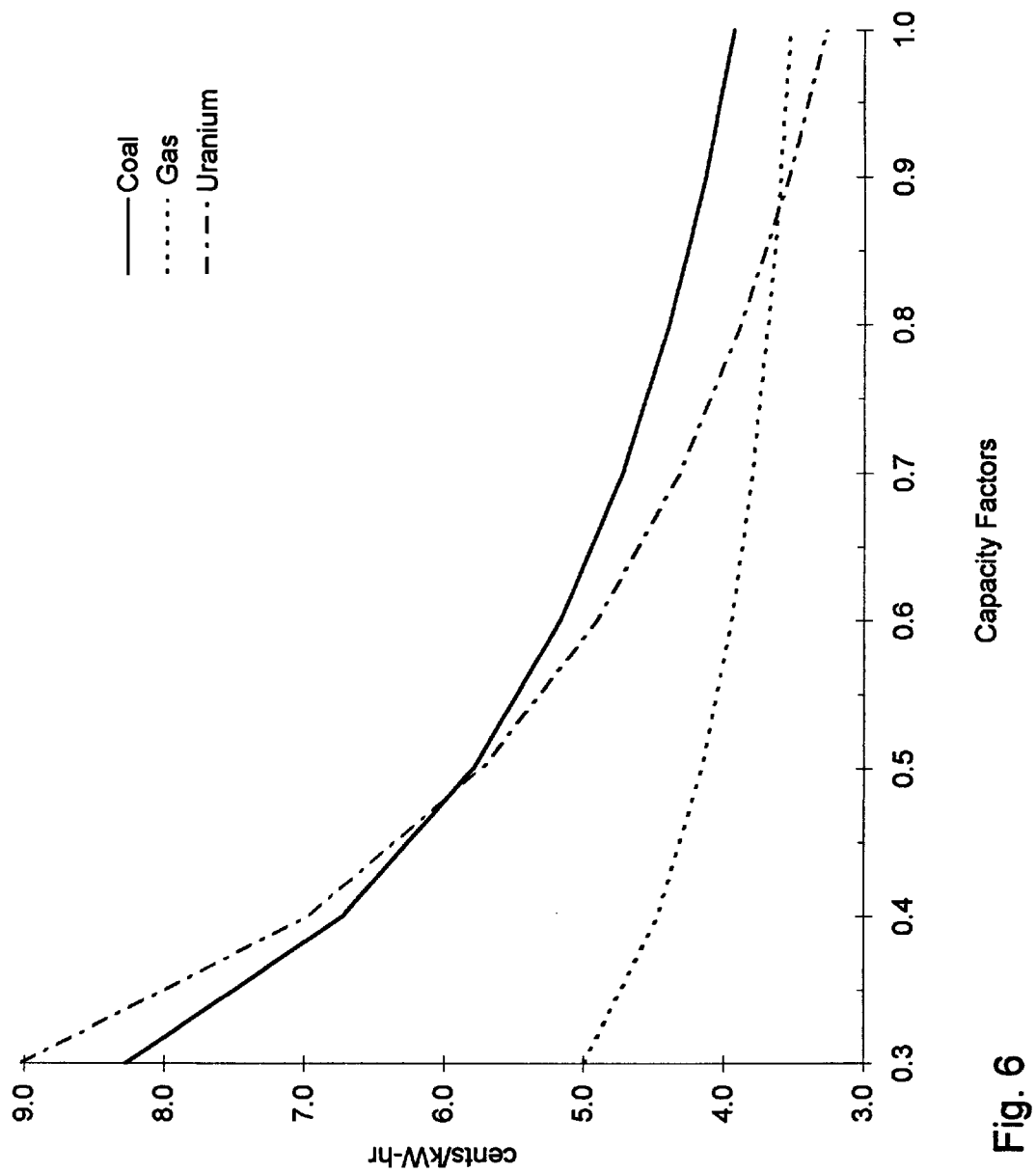
FIG. 6 is an exemplary graph of electricity costs versus capacity factor.

Step 184 converts the LECs and ACFs to a graphical format, and the results are presented in FIG. 6. Step 186 obtains the ACF (0.80) of the first plant from data field 88, applies the range of ±0.10 to the ACF (0.70–0.90) and selects the competing plant in one of the data fields 122a–122n with the minimum LEC for each ACF in the data fields 124a–124n of the three competing plants. For the ACFs of 0.70, 0.80 and 0.90, the GTCC plant has the lowest LECs, and the GTCC design in the data field 72b is identified as the selected competing plant. Step 186 completes the operations of the screening routine by storing the lowest LECs in the data fields 128a through 128n in FIG. 5F. The option of including any competing plants with LECs 10% higher than the minimum LECs was not exercised in the example.

Competing-cost Routine

Figure 7:
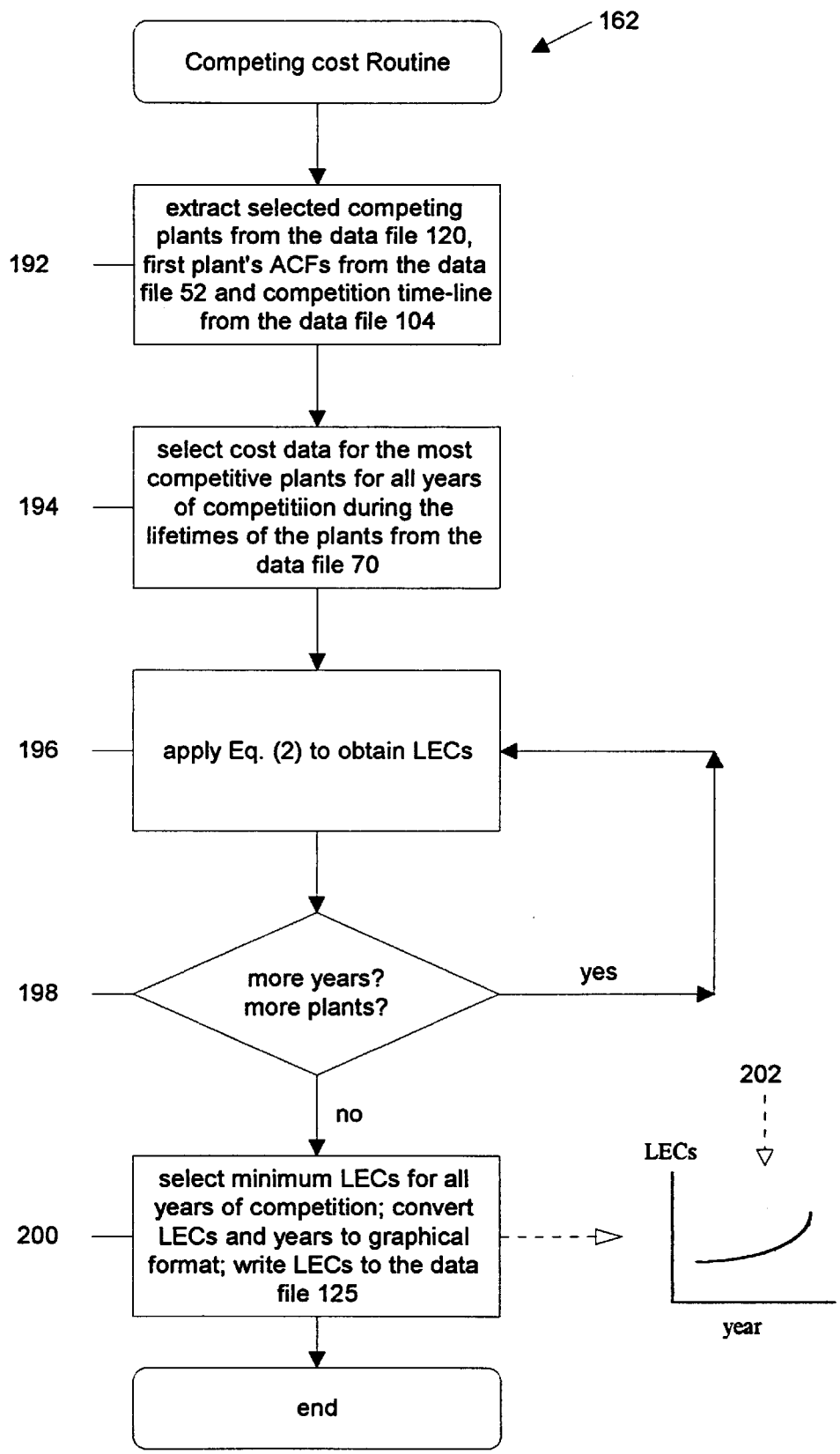
FIG. 7 is a flow diagram of the competing-cost routine 162 shown schematically in FIG. 3.

FIG. 7 is a flow diagram of the competing-cost routine 162 shown schematically in FIG. 3. Once the likely the competing plant(s) has (have) been determined in the screening routine 160, the cost of the most competitive electricity is calculated in competing-cost routine 162, where it is levelized over the life of the competing plant. The "most competitive electricity" for a given year is defined here as the lowest LEC produced by the competing plant(s) which begin(s) operation the same year in which the first plant enters the competitive market. The two key operations in the routine are calculating the LECs for the completing plant(s) for each year between YEC and YEL, and determining the minimum LEC for each year. The calculations of the LECs use the same equation for levelized electricity cost as used in the screening routine 160, but differ from those calculations in that they are performed for a single value of ACF, i.e., the first plant's ACF, and for every starting year in the period between YEC and YEL. This period is known hereafter as the duration of competition.

Referring to FIG. 7, step 192 obtains the ACF of the first plant from the data field 52 in the data file 40, the time-line of market competition and first plant operation from the data file 104, and the likely competing plants from the data fields 72a–72n. Step 194 extracts the data for each competing plant from the data file 70, and step 196 uses Equation (2) to calculate the LEC for the completing plant(s) and for the starting years in the duration of competition. Step 198 checks that all LECs have been obtained, and step 200 determines the minimum LEC for each year and stores them in the data file 125. It also converts the LECs and the corresponding years into a graphical format for plotting by step 202.

Example—Continued

Figure 8:
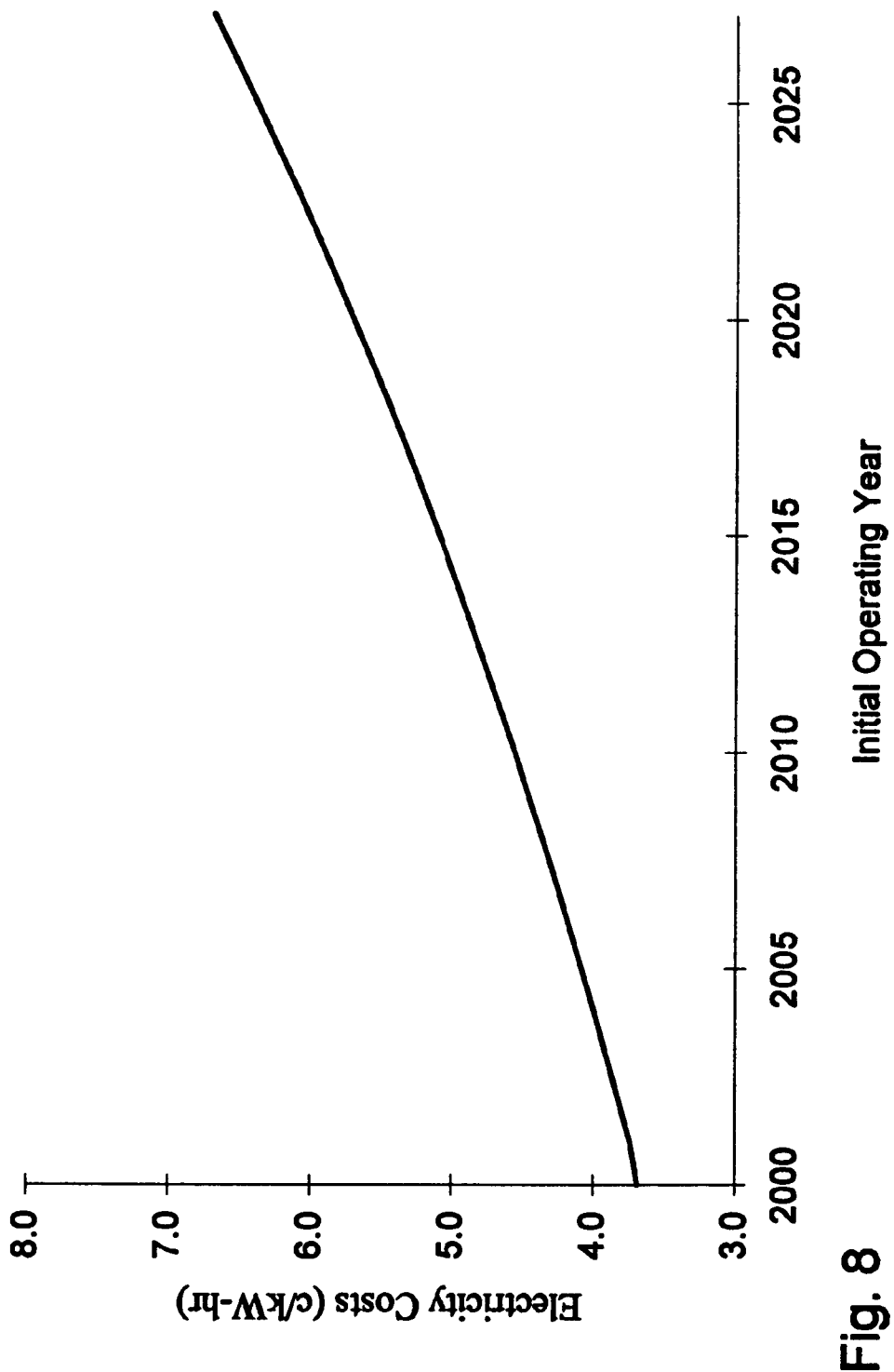
FIG. 8 is an exemplary graph of electricity cost versus initial operating year.

Continuing with the example described above, the screening routine 160 selected the GTCC plant in the data field 72b as the only competing plant. Step 192 in the competitive-cost routine 162 extracts the GTCC name from one of the data fields 72a–72n, the first plant ACF from the data field 52 and the competition time-line data from data file 104. Step 194 uses the competing plant name to identify the cost data for the GTCC in data file 70. With the cost data and ACF, step 196 calculates the LECs for each starting year in the duration of competition. After the LECs has been obtained for the period from 2000 to 2025, step 198 determines that the LEC calculations have been completed. Step 200 determines the minimum LEC for each starting year and stores them in data fields 128a through 128n, as shown in FIG. 5F. Step 200 also converts the LECs and their corresponding years to a graphical format, which is plotted by step 202 and shown in FIG. 8. The plot shows that the values of LEC from the GTCC plant increase slowly over the period of time from 2000 to 2025, but they would still remain the minimum costs because the LECs of the other plants would increase too.

Competitive-value Routine

Figure 9:
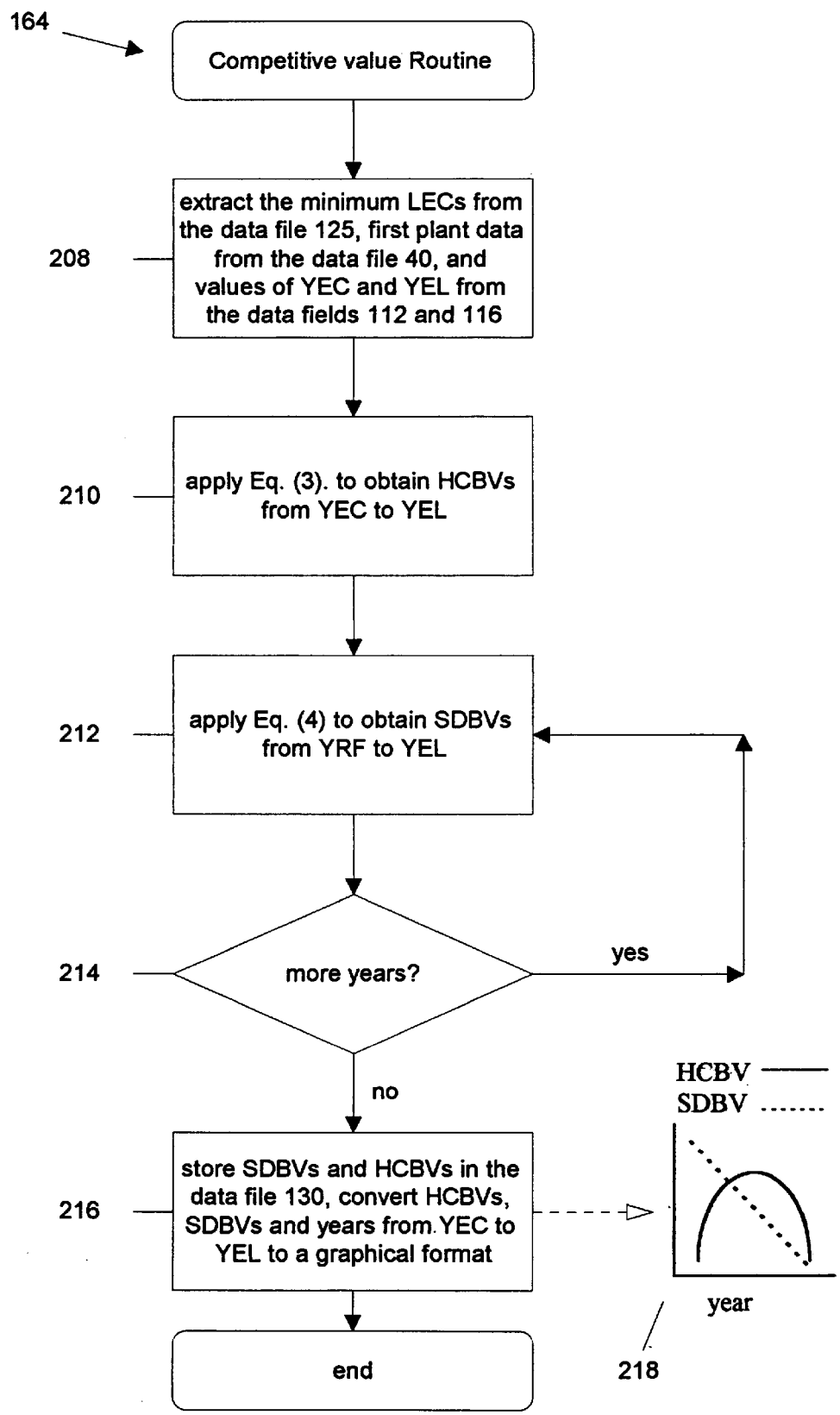
FIG. 9 is a flow diagram of the competitive-value routine 164 shown schematically in FIG. 3.

FIG. 9 illustrates the competitive-value routine 164, the main function of which is to generate the unique parameter of the system 10: the HCBVs for the first plant. The HCBV in a given year is defined as the hypothetical book value of the first plant which would result in the cost of its electricity, levelized from the given year to the end of its life, being equal to the most competitive LEC calculated in competing-cost routine 162 for the competing plant starting operations in the given year.

The key operations of the competitive-value routine 164 are first calculating the HCBVs and then the SDBVs for the years in the duration of competition. The HCBVs are obtained by rearranging Equation (2) so the plant's capital cost is the dependent variable, as shown below.

$$HCBV = (\{LEC - [VFC*KBK*TEF + VOM + VOC]*100\}*100/8766/[MWE*ACF] + FOM + FOC)/CRF \quad (3)$$

The values of LEC are taken from the data file 125, and the fixed and variable costs, the ACF and the CRF are those for the first plant in the data file 40, levelized over the duration of competitive operation. Although the values of HCBV need to be calculated only for the period that the plant would be at risk of having stranded costs, they are typically tabulated and plotted for all the years in the duration of competition.

The straight-line depreciation equation for SDBV after YOP years of operation of the first plant is:

$$SDBV = FCC*(1.0 - SDR*YOP) \quad (4)$$

The values of FCC and SDR are taken from the data fields 56a and 60, respectively.

Referring to FIG. 9, step 208 reads all the LEC values from the data fields 128a through 128n, the first plant data from the data fields 52 through 60, and the time-line years from the data fields 112 and 116. Beginning with the year YCO, step 210 substitutes these data into Equation (3) to obtain the HCBVs, and step 212 applies Equation (4) to calculate the SDBVs. Step 214 checks whether the HCBVs for all years within the duration of competition have been obtained. After completion of the HCBV and SDBV evaluations, step 116 stores their values in the data file 130, and converts the HCBVs, SDBVs and years to a graphical format. Step 218 plots the book values over the duration of competition.

Example—Continued

Figure 5G:
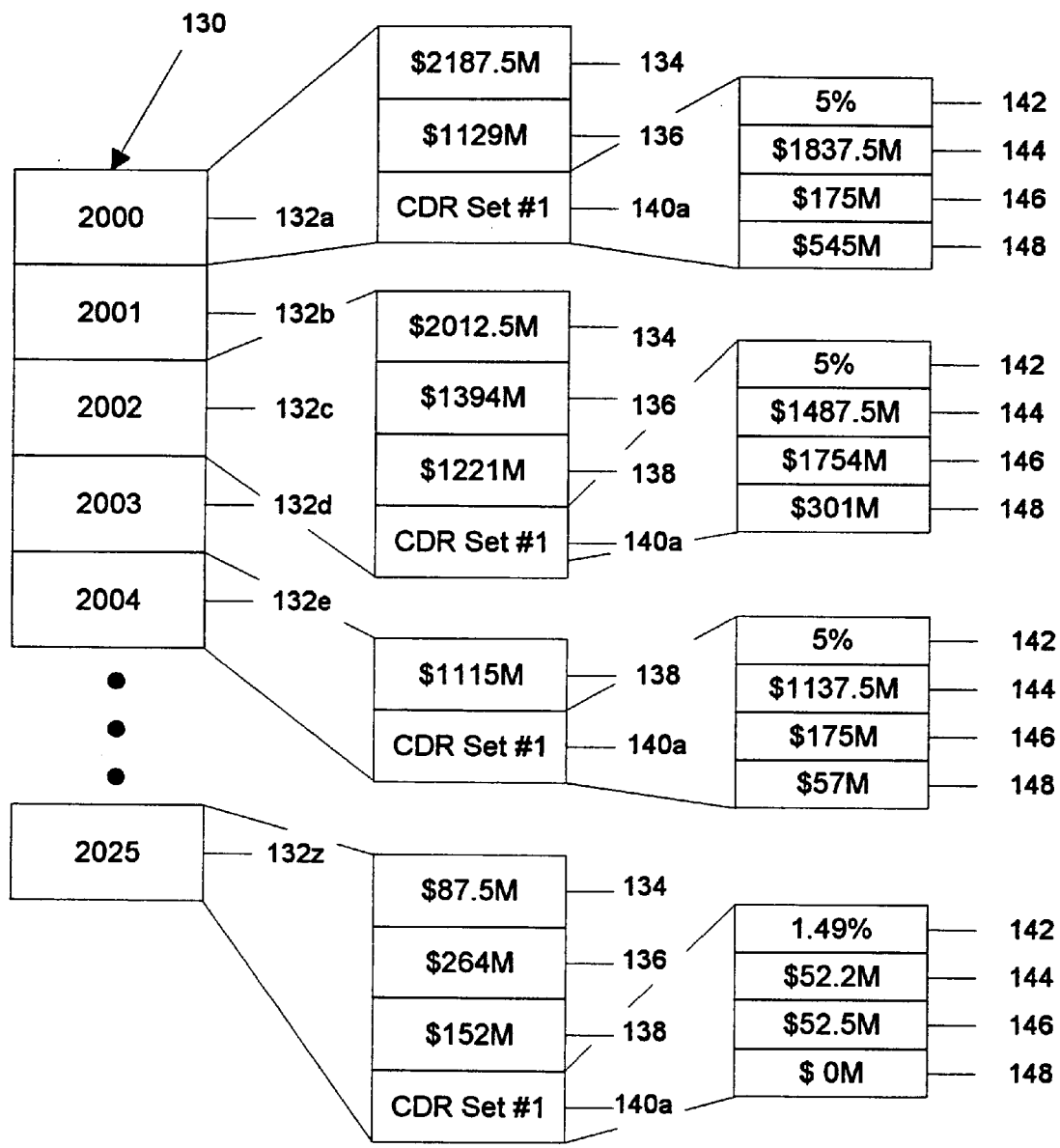
Figure 10:
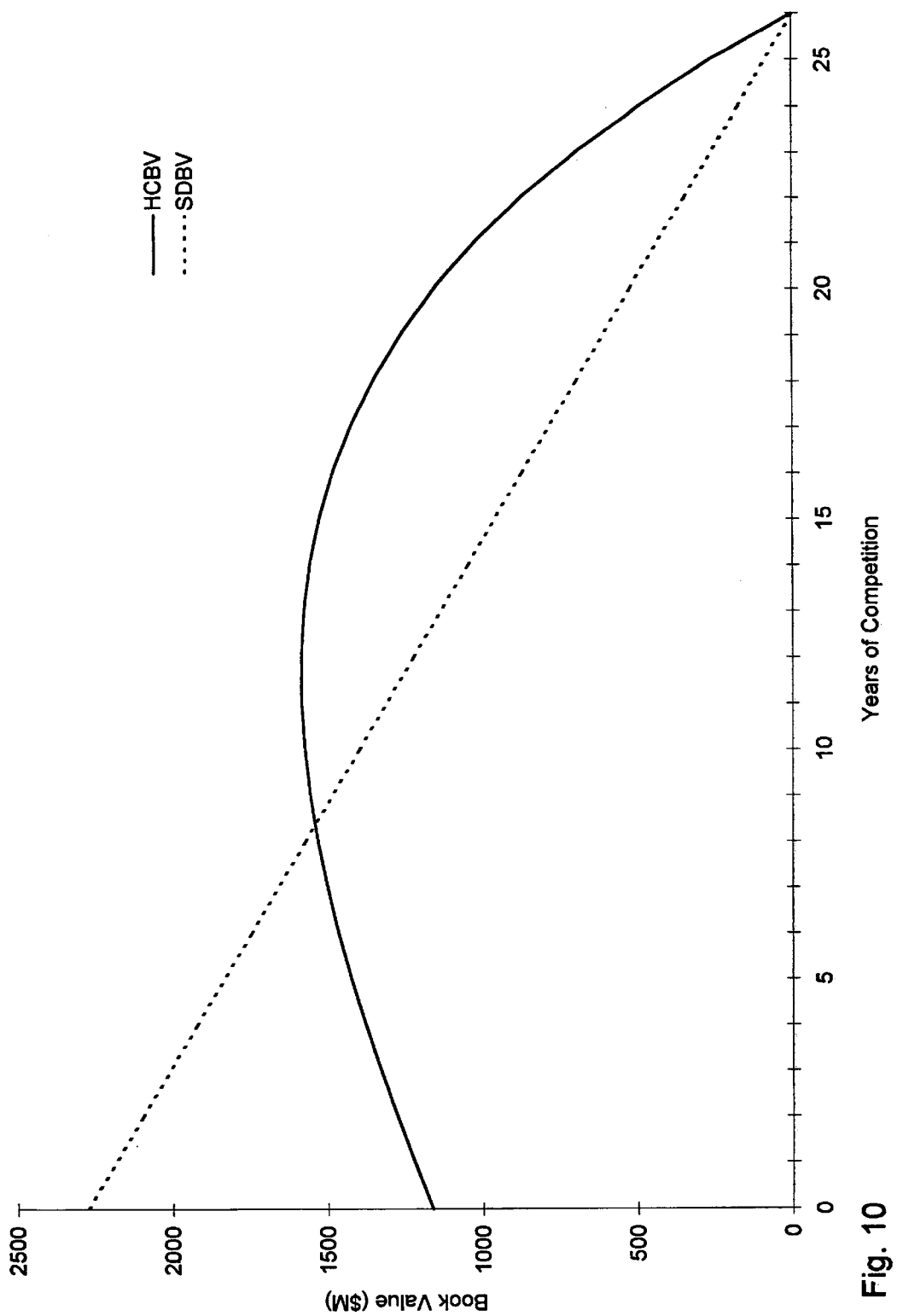
FIG. 10 is an exemplary graph of book value versus year of competition.

The example, which was discussed in the section on the competing-cost routine 162, continues with the operation of the competitive-value routine 164. In step 208, the values of the minimum LECs are read from the data fields 128a–128n in FIG. 5F, the first plant data are read from the data fields 52 through 60 in FIG. 5A, the values of YEC and YEL from the data fields 112 and 116, respectively, in FIG. 5D. A total of 26 values of HCBV and 26 values of SDBV are calculated in steps 210 and 212, respectively. In step 216, the SDBV values are stored in the data field 134 for each year shown in the data fields 132a–132z, and the HCBV values are stored in the data field 136 for each year shown in the data fields 132a–132z, as shown in FIG. 5G. The values, converted to graphical format in step 216, are plotted in step 218, as shown in FIG. 10.

Competitive-rate Routine

Figure 11:
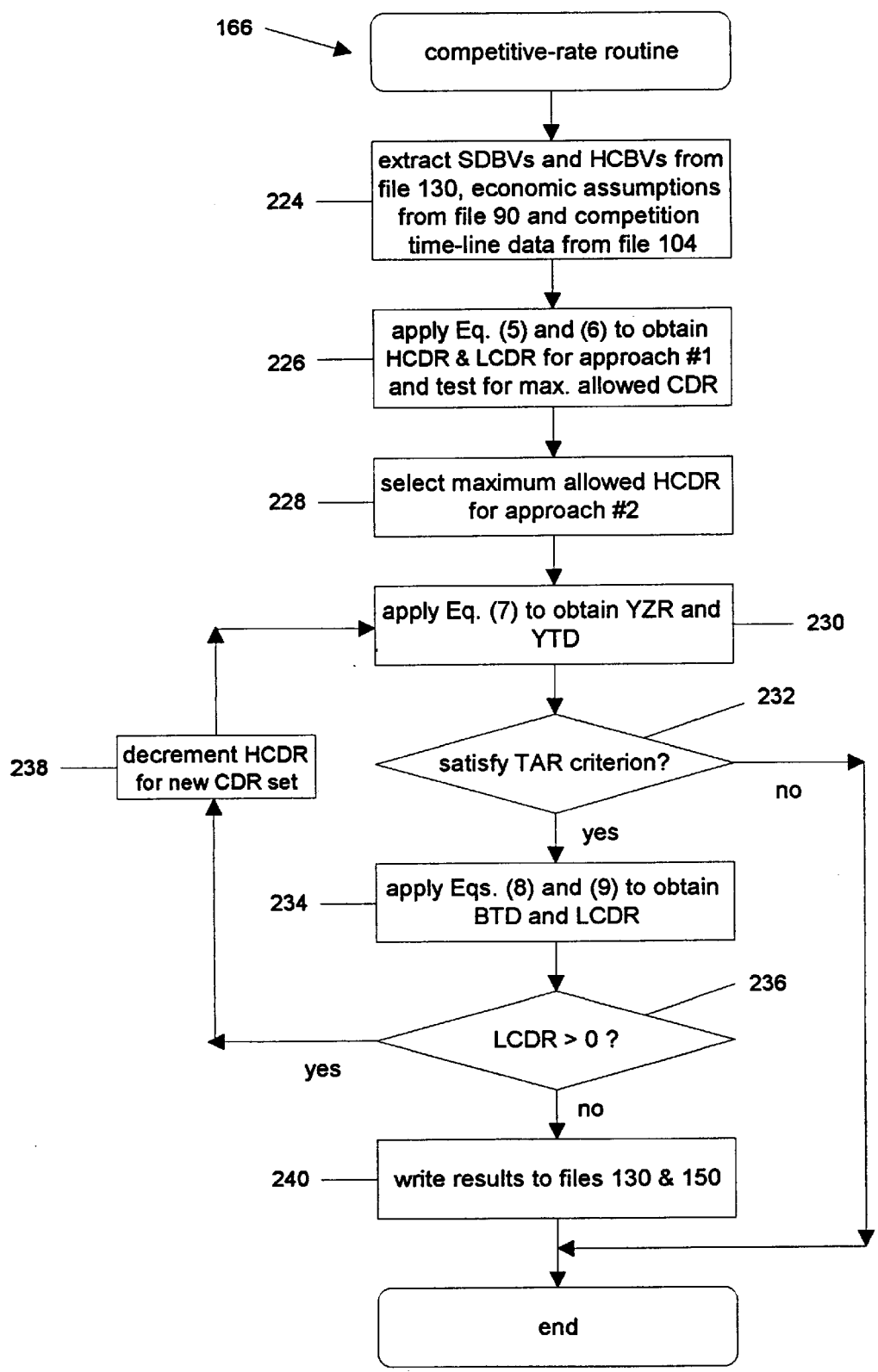
FIG. 11 is a flow diagram of the competitive-rate routine 166 shown schematically in FIG. 3.

FIG. 11 illustrates the competitive-rate routine 166, the function of which is to determine valid sets of CDRs. The validity of the CDRs is determined by satisfying the economic assumptions in the data file 90. Specifically the CDR must not exceed the maximum allowed depreciation rate (data field 92) and the TAR must not exceed the maximum time-at-risk (data field 94). The CDR are also required, by definition, to result in competitive electricity generation over the life of the first plant.

Before discussing the routine further, definitions of the various depreciated book values are provided. As discussed in the competitive-value routine 164, the SDBV for a given year is the book value obtained by applying the SDR for the years between the given year and YBO. The CDBV for a given year after YAD is the book value obtained by applying the SDR for the years between YAD and YBO and then by applying the CDRs for the years between the given year and YAD. The actual book value is designated for years in the time-line by simply substituting a "B" for the "Y". For example, BBO is the book value for the year YBO, and BAD is the book value for the year YAD. All book values are stored either as SDBV or CDBV (data fields 134 and 136, respectively, in the data file 130) for a given year.

The competitive-rate routine 166 has two key operations: the calculation of a CDR set using a first approach (approach #1) and the calculation of multiple sets of CDRs using a second approach (approach #2). Both approaches entail first applying one or more higher depreciation rates (HCDR) than the standard one, and then one or more lower depreciation rates (LCDR) than the standard one. In the first approach appropriate HCDR or HCDRs is (are) first applied in the year YAD, which is (YCO–YAD) years prior to competition, so the CDBV will equal the HCBV just as competitive operation starts in YCO. The HCBV for the year YCO is designated HBCO. Afterwards the CDBV of the first plant depreciates at a lower rate (LCDR) which will yield a null CDBV at the end of its life (YEL). For the case of one higher and one lower than the standard depreciation rate, HCDR and LCDR respectively, the equations are:

$$HCDR=(BAD-HBCO)/(YCO-YAD) \qquad (5)$$

$$LCDR=1/(YEL-YCO) \qquad (6)$$

This approach may require depreciation charges that are larger than the maximum allowed by the economic assumptions, so a second approach is also used. The basis for this approach is to achieve an average value of the CDBV which equals the average depreciated HBCO over a period hereafter known as the duration of competitive operation, that is, from YCO to YEL. This approach is illustrated below for the case of a single HCDR and a single LCDR.

At the beginning of competitive operation, the BCO would be higher than the HBCO, but an HCDR is selected to reduce the CDBV faster than the HBCO is being depreciated. Some time after YCO, the CDBV equals the depreciated HBCO and then becomes less, as the CDBV continues to be depreciated at a higher rate than HBCO. When the CDBV equals the depreciated HBCO, the first plant is by definition no longer at risk. The time at which the first plant attains the zero risk status is designated as YZR, and the time-at-risk is defined as the lapsed time from YCO to YZR, or $$TAR=YZR-YCO \qquad (7)$$

For a single value of HCDR, the equation for the YZR is:

$$YZR=[1-SDR*(YAD-YBO)+HCDR*YAD-FAC*YEL]/(HCDR-FAC), \qquad (8)$$

where FAC=HBCO/FCC/(YEL−YCO).
The competitive-rate routine 166 next calculates the transition time (YTD) at which the HCDR ceases and a lower depreciation rate, LCDR, begins and continues until the first plant is fully depreciated at the end of its life (i.e., YEL). The transition time is set to yield CDBVs, averaged over the duration of competitive operation, equal to the HBCOs depreciated by the straight-line method, also averaged over the same period. For a single value of HCDR, the equation below is used in competitive-rate routine 166 to calculate the year in which the transition takes place:

$$YTD=YCO+[BCO-HBCO]/[HCDR*FCC-BCO/(YEL-YCO)] \qquad (9)$$

The values of the book value at YTD (i.e., BTD) and the LCDR corresponding to HCDR calculated above are obtained from the equations below:

$$BTD=HBCO*(1.0-HCDR*(YTD-YCO)) \qquad (10)$$

$$LCDR=1/(YEL-YTD) \qquad (11)$$

By a trial-and-error procedure the maximum and minimum HCDRs which satisfy the constraints are calculated. It is possible that there is no set of CDRs which satisfies the economic assumptions and meets the requirement of competitive cost, unless negative CDBVs are allowed.

This approach can also be used for cases of multiple HCDRs and LCDRs, but generalized equations, such as the ones above, can not be derived for YZR and YTD without specifying the relationship among the CDRs in the set. Given this relationship competitive-rate routine 166 would apply the same principle as it did above for a single HCDR and a single LCDR, i.e., the values of the CDBVs and the depreciated HCBVs, both averaged over the duration of competitive operation, must be equal.

Referring to FIG. 11, values of SDBVs and HCBVs from the data file 130, and economic assumptions and competition time-line from the data files 90 and 104, respectively, are obtained by step 224. Step 226 uses these data in Equations (5) and (6) to obtain the CDR set for approach #1. The step next determines whether the first approach produces an acceptable HCDR by imposing the maximum allowable CDR (MCDR in the data field 92). Approach #2 begins with assuming the HCDR for the first iteration is equal to MCDR in step 228. Step 230 applies this HCDR, the time-line data from the data file 104 and the FCC from the data field 56a to calculate YZR from Equation (8) and to calculate YTD from Equation (9). The value of YZR is checked for the "time-at-risk" criterion (data field 94) in Step 232. If it fails the criterion, no further valid sets of CDRs exist for approach #2, and control passes out of the routine. If the "time-at-risk" criterion is satisfied in step 232, YTD is used in Equations (10) and (11) to complete the determination of the CDR set by calculating the corresponding LCDR in Step 234. Step 236 checks that the LCDR is greater than zero, a condition for a valid value. If so, the current value of HCDR is decreased by the increment in step 238 and returned to step 230 which calculates the next CDR set. Once the TAR exceeds the maximum allowed or the LCDR falls below zero, no further valid CDR sets exist, so step 240 writes the valid CDR sets to the data file 130.

Example—Continued

Figure 5H:
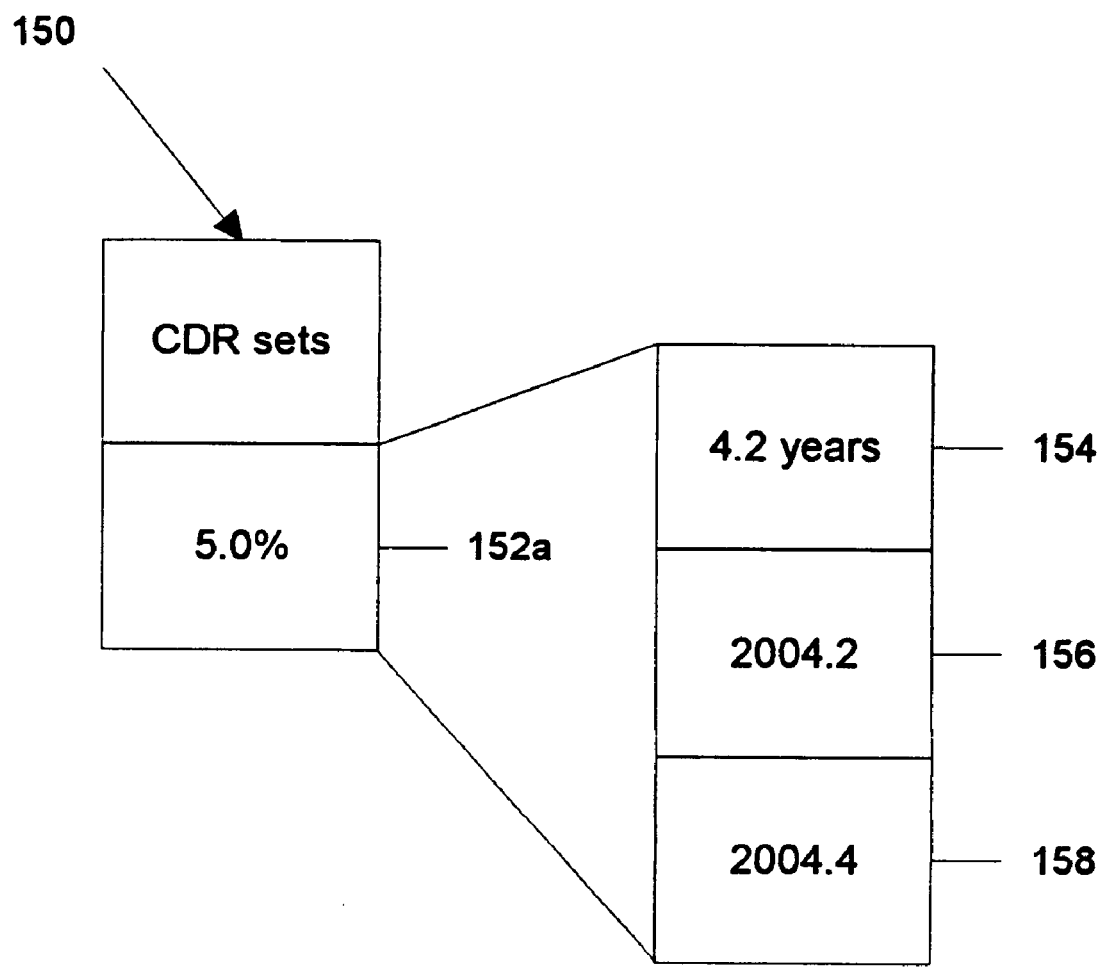

Returning to the example again, the operation of the competitive-rate routine 166 begins with step 224 reading the FCC from the data field 56a (FIG. 5A), the economic assumptions from the data fields 92 through 100 (FIG. 5C), the competition time-line years from the data fields 108 through 118 (FIG. 5D), and the SDBVs and HCBVs from the data fields 134 and 136, respectively in FIG. 5G. Step 226 uses the first approach to calculate a HCDR of 5.73% which is not valid because it exceeds the maximum acceptable rate of 5%. Step 228 selects the maximum allowable CDR of 5% as the first HCDR of Approach #2, and step 230 solves Equation (8) for the YZR equal to 2004.2 and solves Equation (9) for the YTD equal to 2004.4. Step 232 finds that the TAR of nine years is satisfied, and step 234 calculates the LCDR to be 1.49%. Since step 236 finds the LCDR>0, the current HCDR of 5% is lowered by 0.5% in step 238, and the process of calculating additional sets of CDRs continues with a new set having a HCDR equal to 4.5%. The CDR calculation ends when either the criteria of either time-at-risk or positive LCDR are violated. The CDRs and CDBVs for CDR Set #1 are given (in data fields 142, 144) in FIG. 5G for the years YEC, YCO, YTD and YEL; the values of CDBV at YCO and YTD equal BCO and BTD, respectively, in Equations (9) and (11). For CDR Set #1, the values of TAR, YZR and YTD are shown in FIG. 5H.

Depreciation Routine

Figure 12:
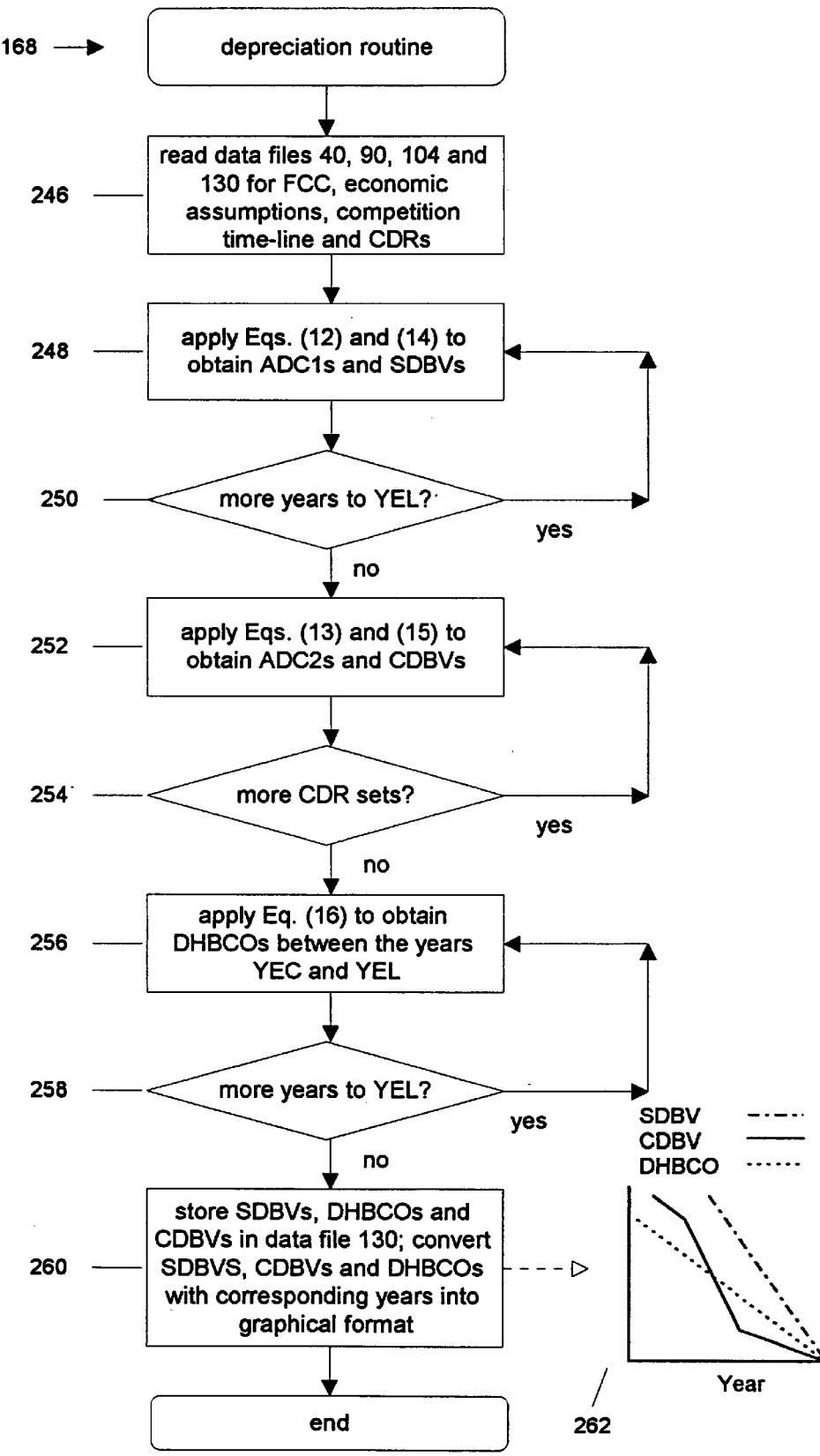
FIG. 12 is a flow diagram of the depreciation routine 168 shown schematically in FIG. 3.

FIG. 12 illustrates the depreciation routine 168, which produces the annual depreciation charges (ADCs) and the depreciated book values of the actual first plant and the hypothetical one from the present (i.e., reference year) to the end-of-life. The three main operations of the routine are the calculation of the standard ADCs and book values during the life of the first plant, then the calculation of the ADCs and CDBV corresponding to its period of CDRs (i.e., YAD to YEL) and lastly the depreciated value of HBCO from YEC to YEL.

The equations below used in the first two operations of the routine are presented for the case of a single HCDR and a single LCDR.

$$ADC1=FCC*SDR, \text{ from the beginning of operations } (YBO) \text{ to end-of-life } (YEL) \qquad (12)$$

$$ADC2=FCC*HCDR, \text{ from YAD to transition year (YTD)} \quad (13a)$$

$$ADC2=FCC*LCDR, \text{ from YTD to end-of-life (YEL)} \quad (13b)$$

The depreciated book value of the first plant for a given year is obtained by subtracting the total depreciation charges up to that time from the capital cost (FCC). For example, the SDBV for the year of YSD is given by the relationship:

$$SDBV(YSD)=FCC-ADC1*(YSD-YBO) \quad (14)$$

For the year of YHD, while HCDR is being applied between YAD and YTD, the relationship is:

$$CDBV(YHD)=SDBV(YAD)-ADC2*(YHD-YAD) \quad (15a)$$

For the year of YLD, in which LCDR is in effect between YTD and YEL, the relationship is:

$$CDBV(YLD)=DBV(YTD)-ADC3*(YLD-YTD) \quad (15b)$$

The routine then determines DHBCO, the depreciated value of the first plant's HBCO for each year from the start of competition (YEC) to the end of its life (YEL). The value of the DHBCO for the year YHC is given by the equation:

$$DHBCO=HBCO*(YEL-YHC)/(YEL-YCO) \quad (16)$$

Referring to FIG. 12, step 246 of the routine reads FCC and SDR from the data file 40, the number of HCDRs and LCDRs in the CDR set from the data file 90, the time-line of competition from the data file 104, and the CDRs and YTDs from the data file 130. The ADC1s and SDBVs are calculated for the full life of the first plant in step 248 from Equations (12) and (14). After step 250 determines that these calculations are completed, the ADC2s and CDBVs are obtained from Equations (13) and (15) in step 252 between YAD and YEL for the period in which CDRs apply. After step 254 finds that these calculations are completed, the values of DHBCOs are obtained in step 256 from Equation (16) for the period of competition. Step 260 writes the ADCs and depreciated book values to the data file 130, and converts them and the years to a graphical format for plotting in step 262.

Example—Continued

Figure 13:
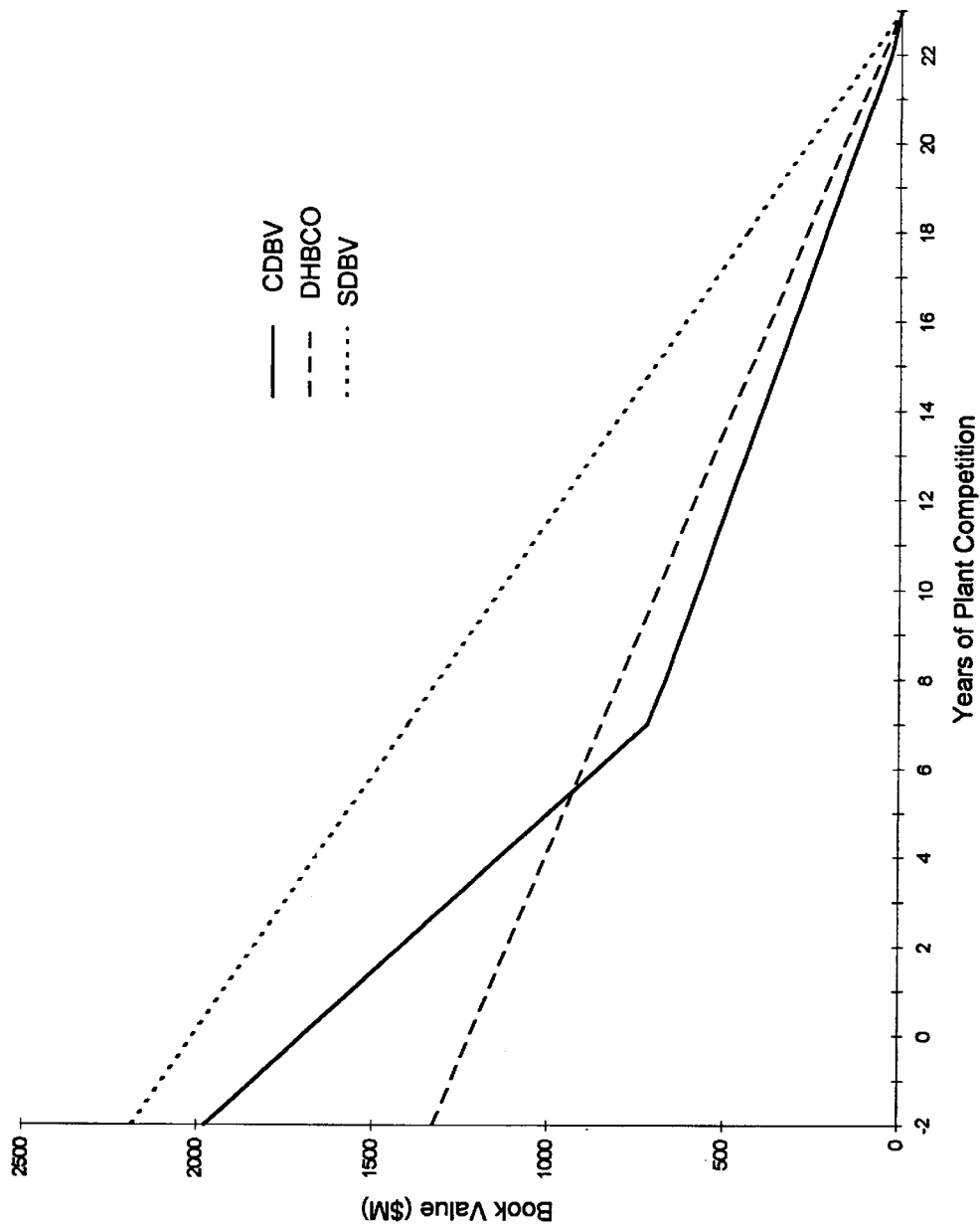
FIG. 13 is an exemplary graph of various book values versus years of competition.

Referring again to the example, the depreciation routine 168 extracts the YBO, FCC and SDR from the data fields 48, 56a and 60, respectively, in FIG. 5A, the time-line for competition from the data fields 106 through 118 in FIG. 5C, and the CDRs in the data fields 142a through 142n in FIG. 5G. The depreciation routine 168 obtains the SDBVs, CDBVs and DHBCOs by using these data in Equations (12) through (16), respectively, stores the results in the data file 130. FIG. 5G gives the values of SDBVs, CDBVs and DHBCOs for the CDR set #1 (5% and 1.49). The SDBVs are evaluated for all years between YBO and YEL, while the CDBVs are calculated only between YAD and YEL, and the DHBCOs only between YEC and YEL. The plot of the three quantities in FIG. 13, shows the values over the duration of competition.

Stranded-asset Routine

Figure 14:
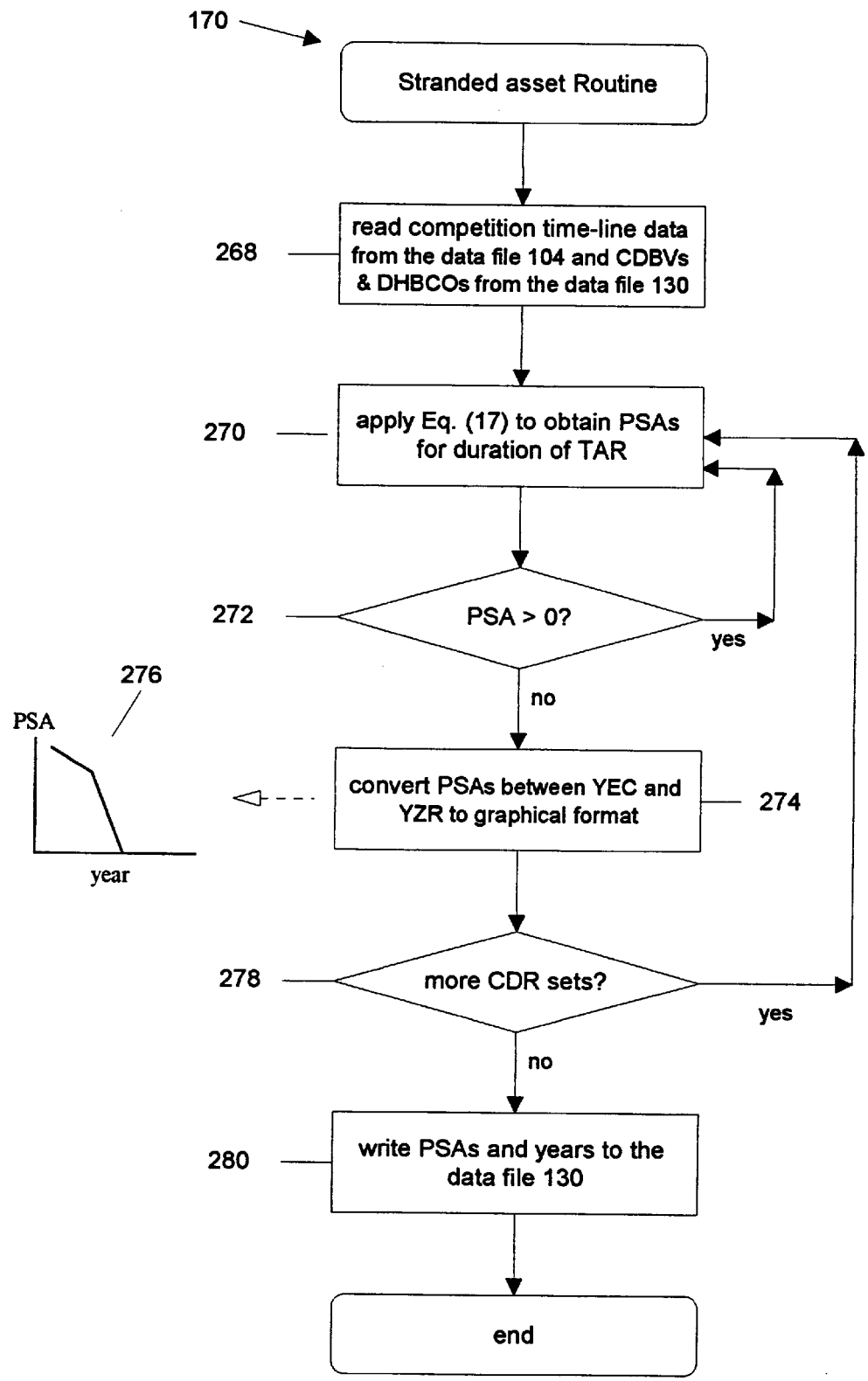
FIG. 14 is a flow diagram of the stranded-asset routine 170 shown schematically in FIG. 3.

FIG. 14 illustrates the stranded-asset routine 172, which calculates the PSAs over the time-at-risk for each CDR set. The routine consists of the single key operation of evaluating the PSAs. As defined earlier the PSA is the portion of the capital cost of the first plant that would not be recovered by selling the first plant's electricity in a competitive market. Since the HCBV has been defined as the book value of the first plant that would exactly be recovered in a competitive market, the difference between the current book value of CDBV and the DHBCO is the PSA of the first plant. As long as the CDBV is greater than the DHBCO, a PSA exists and the plant is "at-risk". It follows from the definition that the value of the PSA of the first plant at any given time, is given in the equation below:

$$PSA=CDBV-DHBCO \text{ in a given year.} \quad (17)$$

Referring to FIG. 14, step 268 reads YEC and YEL from the data fields 112 and 116, respectively, and CDBVs and DHBCOs for each set of CDRs from the data file 130. Step 270 applies Equation (17) to obtain the PSAs for a set of CDRs starting with YEC and continuing toward YEL, until step 272 determines that the value of the PSA is no longer positive. Step 274 converts the PSA and time data into a graphical format for plotting by step 276. The calculation of the PSAs in step 270 continues until step 278 finds that the PSAs for all CDR sets have been evaluated. Step 280 stores the PSA in the data file 130.

Example—Continued

Figure 15:
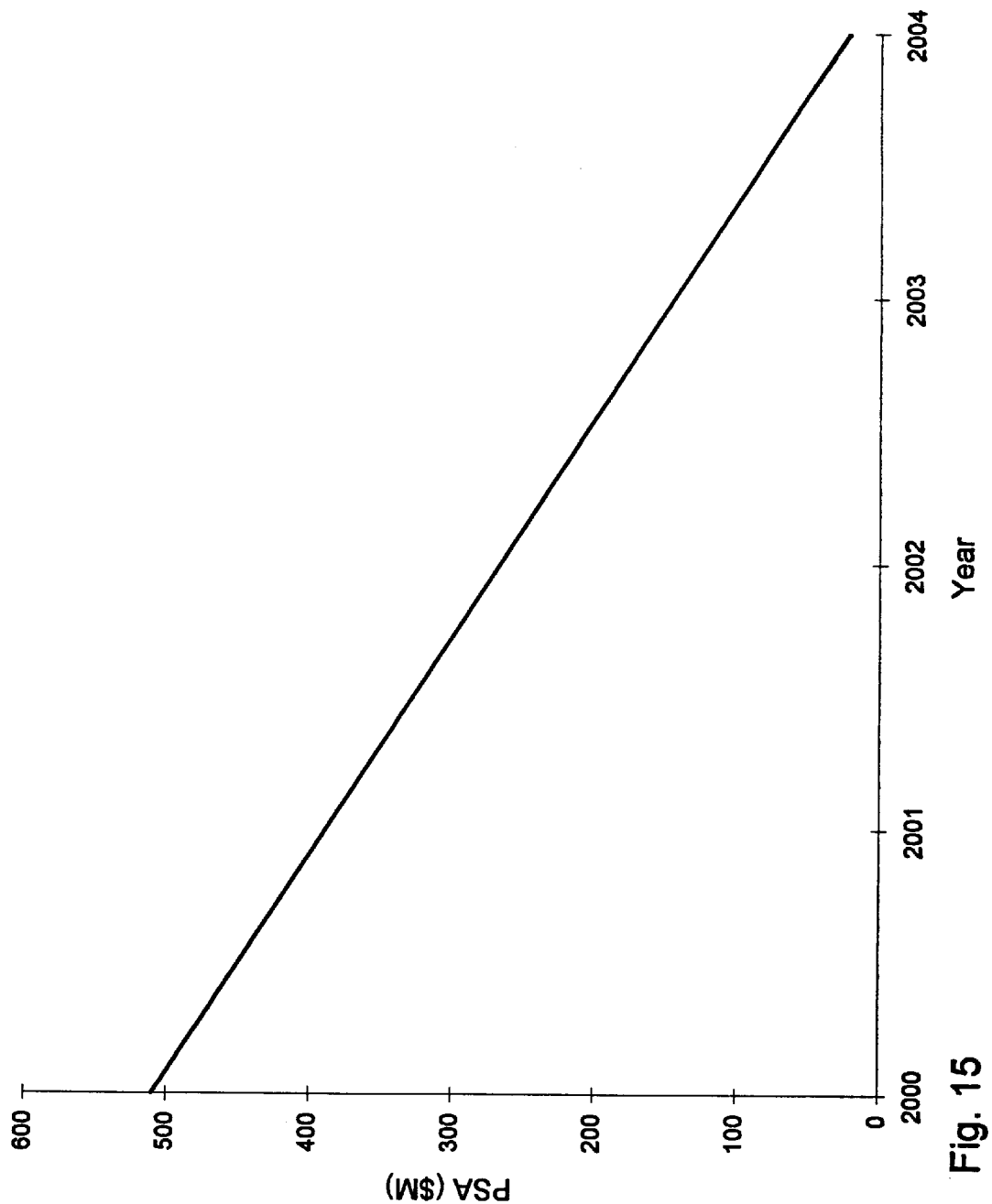
FIG. 15 is an exemplary graph of potential stranded assets versus year.

The description of the example continues from the previous routine to its operation in the stranded-asset routine 170. YEC and YEL are read from the data fields 112 and 116, respectively, in FIG. 5D, and CDBVs and DHBCOs from the data fields 144 and 138, respectively, for the CDR set #1 in FIG. 5G. The calculations of the PSAs are performed in the example for the CDR set #1 only, and five values are obtained. The last year with a positive PSA is 2004, which gives the approximate time-at-risk of 4 years, in close agreement with the exact value of 4.2 years calculated in the competitive-rate routine 166. For CDR Set #1, FIG. 15 presents the PSAs plotted for the years of risk, and FIG. 5G shows the values stored in data file 130. With the PSAS, the system has completed the calculation of the economic parameters of the first plant.

Example—Summary

The system 10 has produced in this example of its operation HCBVs on which are based sets of depreciation rates resulting in competitive operation of the first plant within the given time-lines and assumptions. Each CDR set is composed of a HCDR and a LCDR. For each set of CDRs, the time-at-risk, the book values, the ADCs and the PSAs are determined. The results produced by the system 10 provide a variety of solutions to making the first plant generate electricity competitively in a market economy.

| Name | Definition | Units |
|---|---|---|
| ACF | annual capacity factor | fraction |
| ADC | annual depreciation charge (includes ADC1, ADC2 and ADC3) | $/year |
| BAD | the first plant DBV @ start of HCDR | $ |
| BBO | initial the first plant DBV | $ |
| BCO | the first plant DBV @ assumed actual start of competitive operation | $ |
| BDD | the first plant DBV @ decommissioning | $ |
| BEC | the first plant DBV @ earliest possible start of competition | $ |
| BEL | the first plant DBV @ end-of-life | $ |
| BRF | the first plant DBV @ reference year | $ |
| BTD | the first plant DBV @ transition year | $ |
| CDBV | competitive depreciated book value | $ |
| CDR | competitive depreciation rate | 1/yr |
| CRF | capital recovery factor | 1/yr |
| DBV | depreciated book value of the first plant | $ |
| DHBCO | depreciated value of HBCO | $ |
| EFC | annual escalation rate of FCC | no units |

-continued

| Name | Definition | Units |
|------|------------|-------|
| EFM | annual escalation rate of FOM | no units |
| EFO | annual escalation rate of FOC | no units |
| ESR | generic annual escalation rate | no units |
| EVF | annual escalation rate of VFC | no units |
| EVN | annual escalation rate of VOM | no units |
| EVO | annual escalation rate of VOC | no units |
| FAC | a factor defined to simplify equations | 1/year |
| FCC | fixed capital cost | $ |
| FOC | other fixed costs | $ |
| FOM | fixed operational & maintenance costs | $ |
| GTCC | gas turbine combined cycle | no units |
| HCBV | hypothetical competitive book value | $ |
| HBCO | the first plant HCBV @ assumed actual start of competitive operation | $ |
| HCDR | higher-than-standard depreciation rate | 1/yr |
| KBK | conversion from MBTU to kw-hr | MBTU/kw-hr |
| LCDR | lower-than-standard: depreciation rate | 1/yr |
| LEC | levelized electricity costs | c/kw-hr |
| MCDR | maximum allowed CDR | 1/year |
| MWE | electrical generating capacity | MW |
| O&M | operating and maintenance | no units |
| PSA | potential stranded asset | $ |
| SDBV | standard depreciated book value | $ |
| SDR | standard (straight-line) depreciation rate | 1/yr |
| SBV | book value based on the SDR | $ |
| TAR | time-at-risk | year |
| TEF | efficiency of thermal-to-electric conversion | % |
| VFC | variable cost of fuel | $/MBTU |
| VOM | variable cost of operations & maintenance | $kw-hr |
| VOC | other variable costs | $kw-hr |
| YAD | year in which CDR starts | — |
| YBO | year in which plant begins operations | — |
| YCO | year in which competitive operation is assumed actually to start | — |
| YDD | year in which plant is fully decommissioned | — |
| YEC | year of earliest possible start of competition | — |
| YEL | year of end-of-life for plant | — |
| YHD | a year during the HCDR application | year |
| YLD | a year during the LCDR application | year |
| YOP | years of operation | year |
| YRF | reference year; usually current year | — |
| YSD | a year during standard depreciation application | year |
| YST | starting year of competing plant | year |
| YTD | year of transition between HCDR and LCDR | — |
| YZR | year in which the plant is no longer at risk | year |

The system was developed for application to power plants, but is structured in a general form that would allow its application to other types of plants whose depreciation may be accelerated to lower the price of its product(s) in an emerging competitive marketplace.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A system for determining a hypothetical competitive book value of a first power-generating plant based on economic analysis of a plurality of potentially competing power-generating plants, said system comprising:
   a processor;
   a memory coupled to said processor, said memory storing economic data relating to said first power-generating plant and said potentially competing power-generating plants;
   determining means coupled to said memory for determining said hypothetical competitive book value of said first power-generating plant based on said economic data relating to said first power-generating plant and said potentially competing power-generating plants, said determining means comprising:
      first means for determining a power-generating cost for each of said potentially competing power-generating plants for each of a number of time periods;
      second means for analyzing said power-generating costs to determine a most-competitive power-generating cost for said power-generating plants for each of said time periods; and
      third means for determining said hypothetical competitive book value for said first power-generating plant based on said most-competitive power-generating costs determined by said second means.

2. A system as defined in claim 1, wherein said determining means additionally comprises fourth means for determining a competitive depreciation rate for said first power-generating plant based at least in part on said hypothetical competitive book value for said first power-generating plant.

3. A system as defined in claim 2, wherein said determining means additionally comprises fifth means for determining a plurality of annual depreciation charges for said first power-generating plant based on said competitive depreciation rate for said first power-generating plant.

4. A system as defined in claim 3, wherein said determining means additionally comprises sixth means for determining a potential stranded asset value for said first power-generating plant based at least in part on said annual depreciation charges for said first power-generating plant.

5. A system as defined in claim 1, wherein said first means comprises means for determining said power-generating cost for each of said potentially competing power-generating plants for each of a number of years.

6. A system as defined in claim 1, wherein said power-generating cost comprises a levelized cost and wherein said first means comprises means for determining said levelized cost for each of said potentially competing power-generating plants for each of a number of years.

7. A system as defined in claim 1, wherein said second means comprises means for determining the lowest power-generating cost for each of said time periods.

8. A system for determining a hypothetical competitive book value of a first power-generating plant based on economic analysis of a plurality of potentially competing power-generating plants, said system comprising:
   a processor;
   a memory coupled to said processor, said memory storing economic data relating to said first power-generating plant and said potentially competing power-generating plants;
   determining means coupled to said memory for determining said hypothetical competitive book value of said first power-generating plant based on said economic data relating to said first power-generating plant and said potentially competing power-generating plants, said determining means comprising:
      first means for determining a power-generating cost for each of said potentially competing power-generating plants for each of a number of time periods;
      second means for analyzing said power-generating costs to determine a most-competitive power-generating cost for said power-generating plants for each of said time periods;
      third means for determining said hypothetical competitive book value for said first power-generating plant based on said most-competitive power-generating costs determined by said second means;

fourth means for determining a competitive depreciation rate for said first power-generating plant based at least in part on said hypothetical competitive book value for said first power-generating plant;

fifth means for determining a plurality of annual depreciation charges for said first power-generating plant based on said competitive depreciation rate for said first power-generating plant; and sixth means for determining a potential stranded asset value for said first power-generating plant based at least in part on said annual depreciation charges for said first power-generating plant.

9. A system as defined in claim 8, wherein said first means comprises means for determining said power-generating cost for each of said potentially competing power-generating plants for each of a number of years.

10. A system as defined in claim 8, wherein said power-generating cost comprises a levelized cost and wherein said first means comprises means for determining said levelized cost for each of said potentially competing power-generating plants for each of a number of years.

11. A system for determining a hypothetical competitive book value of a first power-generating plant based on economic analysis of a plurality of potentially competing power-generating plants, said system comprising:

a processor;

a memory coupled to said processor, said memory storing economic data relating to said first power-generating plant and said potentially competing power-generating plants;

determining means coupled to said memory for determining said hypothetical competitive book value of said first power-generating plant based on said economic data relating to said first power-generating plant and said potentially competing power-generating plants, said determining means comprising:

first means for determining a power-generating cost for each of said potentially competing power-generating plants for each of a number of years;

second means for analyzing said power-generating costs to determine a most-competitive power-generating cost for said power-generating plants for each of said years, said most-competitive power-generating cost being based on the lowest power-generating cost for each of said years;

third means for determining said hypothetical competitive book value for said first power-generating plant based on said most-competitive power-generating costs determined by said second means;

fourth means for determining a competitive depreciation rate for said first power-generating plant based at least in part on said hypothetical competitive book value for said first power-generating plant;

fifth means for determining a plurality of annual depreciation charges for said first power-generating plant based on said competitive depreciation rate for said first power-generating plant; and sixth means for determining a potential stranded asset value for said first power-generating plant based at least in part on said annual depreciation charges for said first power-generating plant.

12. A system for determining a hypothetical competitive book value of a first power-generating plant based on economic analysis of a plurality of potentially competing power-generating plants, said system comprising:

a processor;

a memory coupled to said processor, said memory storing economic data relating to said first power-generating plant and said potentially competing power-generating plants;

a computer program executed by said processor, said computer program determining said hypothetical competitive book value of said first power-generating plant based on said economic data relating to said first power-generating plant and said potentially competing power-generating plants, said computer program:

determining a power-generating cost for each of said potentially competing power-generating plants for each of a number of time periods;

analyzing said power-generating costs to determine a most-competitive power-generating cost for said power-generating plants for each of said time periods; and determining said hypothetical competitive book value for said first power-generating plant based on said most-competitive power-generating costs.

13. A system as defined in claim 12, wherein said computer program determines a competitive depreciation rate for said first power-generating plant based at least in part on said hypothetical competitive book value for said first power-generating plant.

14. A system as defined in claim 13, wherein said computer program determines a plurality of annual depreciation charges for said first power-generating plant based on said competitive depreciation rate for said first power-generating plant.

15. A system as defined in claim 14, wherein said computer program determines a potential stranded asset value for said first power-generating plant based at least in part on said annual depreciation charges for said first power-generating plant.

16. A system as defined in claim 13, wherein said power-generating cost comprises a levelized cost and wherein said computer program determines said levelized cost for each of said potentially competing power-generating plants for each of a number of years.

17. A system as defined in claim 13, wherein said computer program determines the lowest power-generating cost for each of said time periods.

18. A system as defined in claim 12, wherein said computer program determines said power-generating cost for each of said potentially competing power-generating plants for each of a number of years.

* * * * *